US012233901B2

(12) United States Patent
Garimella et al.

(10) Patent No.: US 12,233,901 B2
(45) Date of Patent: Feb. 25, 2025

(54) GRAPH NEURAL NETWORKS WITH VECTORIZED OBJECT REPRESENTATIONS IN AUTONOMOUS VEHICLE SYSTEMS

(71) Applicant: Zoox, Inc., Foster City, CA (US)

(72) Inventors: Gowtham Garimella, Burlingame, CA (US); Andres Guillermo Morales Morales, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 556 days.

(21) Appl. No.: 17/187,170

(22) Filed: Feb. 26, 2021

(65) Prior Publication Data

US 2022/0274625 A1 Sep. 1, 2022

(51) Int. Cl.
*B60W 60/00* (2020.01)
*B60W 30/09* (2012.01)
(Continued)

(52) U.S. Cl.
CPC .......... *B60W 60/001* (2020.02); *B60W 30/09* (2013.01); *B60W 30/0956* (2013.01); *B60W 50/0097* (2013.01); *G06N 3/04* (2013.01); *G06N 3/08* (2013.01); *B60W 2554/404* (2020.02); *B60W 2554/80* (2020.02)

(58) Field of Classification Search
CPC ............... B60W 60/001; B60W 30/09; B60W 30/0956; B60W 50/0097; B60W 2554/404; B60W 2554/80; G06N 3/04; G06N 3/08; G06N 3/044
See application file for complete search history.

(56) References Cited

U.S. PATENT DOCUMENTS 9,008,890 B1 * 4/2015 Herbach .............. G05D 1/0212
340/436
9,120,485 B1 * 9/2015 Dolgov ................. B60W 30/10
(Continued)

FOREIGN PATENT DOCUMENTS

WO WO-2021160319 A1 * 8/2021
WO WO-2022087751 A1 * 5/2022

OTHER PUBLICATIONS

En.wikipedia.org s.v. "Graph neural network," accessed Jul. 7, 2023 https://en.wikipedia.org/wiki/Graph_neural_network (Year: 2023).*
(Continued)

*Primary Examiner* — Daniel M. Robert
(74) *Attorney, Agent, or Firm* — Lee & Hayes, P.C.

(57) ABSTRACT

Techniques are discussed herein for generating and using graph neural networks (GNNs) including vectorized representations of map elements and entities within the environment of an autonomous vehicle. Various techniques may include vectorizing map data into representations of map elements, and object data representing entities in the environment of the autonomous vehicle. In some examples, the autonomous vehicle may generate and/or use a GNN representing the environment, including nodes stored as vectorized representations of map elements and entities, and edge features including the relative position and relative yaw between the objects. Machine-learning inference operations may be executed on the GNN, and the node and edge data may be extracted and decoded to predict future states of the entities in the environment.

20 Claims, 9 Drawing Sheets

(51) Int. Cl.
  *B60W 30/095* (2012.01)
  *B60W 50/00* (2006.01)
  *G06N 3/04* (2023.01)
  *G06N 3/08* (2023.01)

(56) References Cited

U.S. PATENT DOCUMENTS

| | | | |
|---|---|---|---|
| 9,123,152 B1* | 9/2015 | Chatham | G01S 19/13 |
| 10,611,371 B2* | 4/2020 | Kusano | G06V 10/82 |
| 10,831,210 B1* | 11/2020 | Kobilarov | B60W 60/0013 |
| 11,373,411 B1* | 6/2022 | Goh | G06T 7/337 |
| 11,555,706 B1* | 1/2023 | Levihn | G05D 1/0088 |
| 2016/0280265 A1* | 9/2016 | Hass | B62D 15/0265 |
| 2020/0117199 A1* | 4/2020 | Akella | G08G 1/166 |
| 2020/0166364 A1* | 5/2020 | Fujita | G01C 21/367 |
| 2020/0341466 A1* | 10/2020 | Pham | G06V 20/56 |
| 2021/0009119 A1* | 1/2021 | Nattermann | B60W 30/0953 |
| 2021/0009163 A1* | 1/2021 | Urtasun | G08G 1/0112 |
| 2021/0046924 A1* | 2/2021 | Caldwell | B60W 30/0956 |
| 2021/0110484 A1* | 4/2021 | Shalev-Shwartz | B60W 10/18 |
| 2021/0150350 A1* | 5/2021 | Gao | G06N 3/048 |
| 2021/0248460 A1* | 8/2021 | Sykora | G06N 3/08 |
| 2021/0383228 A1* | 12/2021 | Velickovic | G06F 16/2379 |
| 2022/0076432 A1* | 3/2022 | Ramezani | G01S 17/931 |
| 2022/0153314 A1* | 5/2022 | Suo | B60W 60/00276 |
| 2022/0163347 A1* | 5/2022 | Anastassov | G06F 16/285 |
| 2022/0169244 A1* | 6/2022 | Sun | B60W 60/00276 |
| 2022/0171936 A1* | 6/2022 | Wang | G06F 40/289 |
| 2022/0274625 A1* | 9/2022 | Garimella | G06N 3/04 |
| 2022/0277472 A1* | 9/2022 | Birchfield | G06V 10/82 |
| 2023/0004874 A1* | 1/2023 | Rosenfeld | H04W 4/48 |

OTHER PUBLICATIONS

Gao Jiyang et al. VectorNet: Encoding HD Maps and Agent Dynamics From Vectorized Representation. In Proceedings of the IEEE/CVF Conference on Computer Vision and Pattern Recognition (CVPR), Jun. 2020, 9 pages.

PCT International Preliminary Report on Patentability mailed Sep. 7, 2023 for PCT Application No. PCT/US22/16652, 6 pages.

* cited by examiner

GRAPH NEURAL NETWORKS WITH VECTORIZED OBJECT REPRESENTATIONS IN AUTONOMOUS VEHICLE SYSTEMS

BACKGROUND

Autonomous vehicles may include various software-based systems, hardware-based systems, and/or controllers to guide the vehicle through an environment. For example, a controller of an autonomous vehicle can use sensor systems, object perception and prediction systems, and route planning and optimization techniques to plan routes, determine drive paths, and guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze data to make decisions. For instance, while traversing an environment, the autonomous vehicle may use a combination of sensor data from various sensors about the objects in the surrounding environment, as well map data representing the surrounding environment, to analyze the environment and determine how to control and navigate the vehicle in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques described herein relate to predictions and planning operations based on analyses of map data and objects determined in an environment. Various techniques described herein include determining and vectorizing map elements from map data, as well as entities and other objects perceived in the environment, and representing the vectorizing map elements and entities within a graph structure. In some examples, a computing device in a vehicle, such as an autonomous vehicle, may generate and use a graph neural network (GNN) that includes a combination of vectorized map element nodes and/or entity nodes. The GNN also may include an edge network storing offset data (e.g., the relative positions and/or relative yaws) between pairs of objects in the GNN. A graph neural network is a type of neural network which operates on a graph structure. In various implementations, the GNN may be partially connected or fully connected with separate edge features associated with distinct pairs of nodes in the GNN. Machine-learning based inference operations may be performed to update the state of the GNN, including updating nodes and/or edge features, based on internal inputs determined from the GNN itself and/or based on updated observations perceived by the autonomous vehicle in the environment. Updates to the GNN may represent predicted future states of the environment, and the autonomous vehicle may decode portions of the GNN to determine predictions for entity positions, velocities, trajectories, and/or other updated predicted states for the entities in the environment.

As discussed below, the various techniques described herein provide technical improvements in the environment modeling and predictive capabilities of the autonomous vehicles, as well as technical advantages in reducing computing resources and improving efficiency of the prediction and decision-making components of autonomous vehicles.

Figure 1:
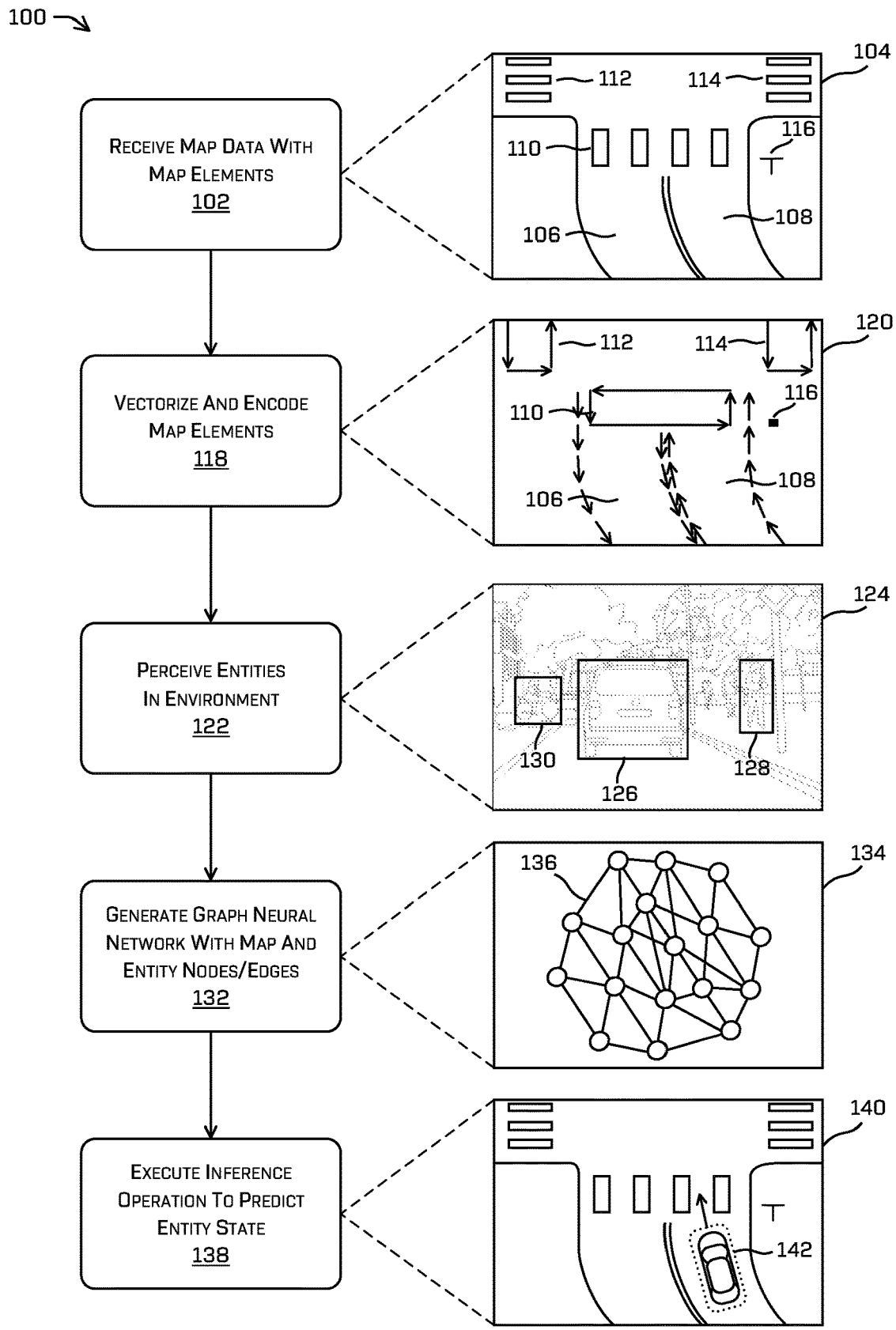
FIG. 1 illustrates techniques for generating and using a graph neural network of vectorized elements to represent and predict an environment of an autonomous vehicle, in accordance with one or more implementations of the disclosure.

FIG. 1 is an illustrated flow diagram depicting a process 100 that includes techniques for generating and using a GNN of vectorized elements to represent and predict the environment of an autonomous vehicle. In some examples, some or all operations discussed in example process 100 may performed by various components or systems of an autonomous vehicle, described in more detail below.

At operation 102, the autonomous vehicle may receive map data including various map elements corresponding to the environment in which the autonomous vehicle is operating. In various examples, map data can include any number of data structures, modeled in two or more dimensions that are capable of providing information about an environment, such as, but not limited to, topologies, intersections, streets, roads, terrain, and the environment in general. In some examples, the autonomous vehicle may receive the map data from an external map server, and/or may store the map data an internal storage. For instance, the autonomous vehicle may request and receive map data from a remote map server, based on a current location of the autonomous vehicle (and/or based on the current time), and store one or maps locally on the vehicle. In some cases, the autonomous vehicle may request and/or receive updated map data from a map server in response to driving into a new region.

The map data received in operation 102 may include data representing various map features (or map elements) within the environment of the autonomous vehicle, including but not limited to roads, lanes, curbs, shoulders, crosswalks, buildings, trees, medians, street signs, traffic signals, speed limits, etc. As an example, box 104 includes a graphical depiction of map data including a number of map elements in an environment. In this example, the map elements include lanes 106 and 108, crosswalks 110-114, and a street sign 116. In some cases, the map data may depict these and other types of permanent or semi-permanent map elements (e.g., road closures, road damage, construction sites, accidents, etc.), but might not include impermanent objects such other vehicles, bicycles, and pedestrians in the environment, or temporary road features such as disabled vehicles, road hazards, or short-term construction projects.

At operation 118, the autonomous vehicle may vectorize one or more map elements within the map data received in operation 102. In various examples, a vectorization component in the autonomous vehicle may identify particular map elements based on the map data, determine a polyline (e.g., a set of line segments) representing each map element, and encode and aggregate the polyline into a node data structure representing with the map element. For example, as shown in box 120 each of the map elements depicted above in box 104 have been identified and vectorized into polylines. For instance, lanes 106 and lane 108 have each been segmented into a number of smaller line segments whose length, location, orientation angle (e.g., yaw), and directionality, when aggregated, define the respective lanes 106 and 108. Similarly, crosswalks 110-114 are each defined by four connected line segments, and street sign 116 is depicted as a single point in the environment.

Each polyline in this example may include one or more points and/or line segments that can be represented as vectors. For instance, each line segment in a roadway, lane, or crosswalk, etc., may be defined by a position, length, orientation, directionality, and/or other attributes. The attributes associated with a line segment may be stored in a vector data structure representing the line segment, and each line segment in the polyline associated with the same map element may be encoded and aggregated into anode structure. In addition to the attributes associated with individual line segments of polyline (e.g., position, length, and orientation), additional attributes may be associated with the map element itself (e.g., map element type, directionality, permissibility, etc.).

In some examples, the vectorization component of the autonomous vehicle may determine a rotational offset for a map element, before or during the encoding process. For instance, the vectorization component may match a map element detected in the environment to a map element template, based on the size, shape, and/or type of the element. To illustrate, crosswalks 110, 112, and 114 each may be matched to a common crosswalk template having a predetermined shape and/or orientation. After matching crosswalks 110-114 to the crosswalk template, the vectorization component may determine a rotational offset for each of the crosswalks 110-114, to represent the difference between the orientation of the crosswalk and the predetermined orientation of the crosswalk template. A rotational offset for an individual crosswalks (or other map element) may be stored as an attribute associated with the vectorized representation of the crosswalk, thereby allowing each crosswalk in the environment to be encoded in the same predetermined orientation, to reduce variation and improve the efficiency and accuracy of the encoding process. As described below, rotational offsets and/or other types of canonical local coordinate frames (e.g., size and shape offsets) may be determined for any map element represented by a polyline, and these offsets (e.g., canonical local frames) may be stored as attributes of the nodes and/or edge features within a graph structure (e.g., a GNN) used to represent the environment. Of course, though depicted in FIG. 1 for illustrative purposes as being performed after receiving the map elements, it is contemplated that such map elements may be previously vectorized such that the vectorized elements may be received directly.

At operation 122, the autonomous vehicle may perceive additional objects in the environment, including entities such as other dynamic objects (e.g., vehicles, bicycles, pedestrians, etc.) moving or operating in the environment. As noted above, the autonomous vehicle may use sensor systems and object perception systems to detect and classify the objects in the environment proximate to the autonomous vehicle. In addition to entities, the autonomous vehicle may perceive other types of objects that may or may not be represented in the map data for the same region of the environment, including road obstacles, visibility conditions (e.g., fog, rain, glare, etc.), the color of traffic lights and/or the status of other traffic signs and signals. For example, box 124 depicts a scene perceived by an autonomous vehicle operating in an environment. In this example, the location of the scene depicted in box 124 may correspond to the same road and intersection represented by the map data shown in box 104. As shown in box 124, the autonomous vehicle in this example has perceived a number of dynamic entities in the environment, including (among other objects) a car 126 directly in front of the autonomous vehicle, a pedestrian 128, and a bicycle 130.

In some examples, the vectorization component of the autonomous vehicle may analyze and vectorize any objects (e.g., entities) perceived by the autonomous vehicle in the environment. For instance, for the car 126, pedestrian 128, and bicycle 130 shown in the environment of box 124, the autonomous vehicle may determine the positions, sizes, poses, velocities, and trajectories of these entities and/or any other objects perceived in the environment. The vectorization component may store the attributes of each perceived entity in a vector data structure. In some examples, entity objects may be vectorized using similar or identical techniques to those used for vectorizing map elements, including defining polylines that represent the size, shape, and location of the entity, encoding the polylines, and aggregating the encodings into a node structure. In other examples, entity objects need not be vectorized using polylines and may be stored as nodes based on their perceived attributes. Accordingly, nodes representing map elements as well as nodes representing perceived entities may be stored as vectorized representations in the same GNN or other graph structure. Although the attributes of map element nodes (e.g., directionality, permissibility, lane type, sign type, etc.) may be different from the attributes of entity nodes (e.g., velocity, acceleration, trajectory, pose, etc.), both types of nodes may be represented by polylines which define the size, shape, orientation/yaw, and location of the object.

At operation 132, the autonomous vehicle generates and/or updates a GNN (or other graph structure) to include the vectorized map element nodes and/or the vectorized entity nodes described above. An example graph structure 136 of a GNN is depicted in box 134. In some cases, a GNN component within the autonomous vehicle may receive vectorized representations of objects (e.g., map elements and/or entities) from the vectorization component, and may create new nodes within the GNN, remove nodes from the GNN, and/or modify existing nodes of the GNN based on the received map data and/or entity data. Additionally, the GNN component may create and maintain edge features associated with node-pairs in the GNN. As noted above, the nodes in the GNN may store sets of attributes representing an object (e.g., a map element node or an entity node), and the edge features may include data indicating the relative positions and/or the relative yaw values of pairs of nodes.

Though not depicted in FIG. 1 for clarity of illustration, in some examples, the GNN may be a fully connected structure in which each distinct pair of nodes is associated with a unique edge feature and/or edge data.

Each edge within the GNN may be associated with a pair of the nodes, and edge data (or edge features) associated with the edge may include relative data between the pair of nodes. As an example, an edge connecting a first entity node and a second map element node may store or be associated with edge data including the relative distance, relative yaw, relative velocity, relative pose, relative size, relative acceleration, relative permissibility, and the like, between the first entity node and the second map element node. In some examples, the GNN may be fully connected, so that a distinct edge is associated with each different pair of nodes. In other examples, the GNN may be partially connected, so that not every distinct pair of nodes has an associated edge.

In various examples, including for both fully connected and partially connected GNNs, the nodes of the GNN may correspond to a native data network that stores the intrinsic attributes associated with the various objects in the environment (e.g., map element objects and entities). In contrast, the edges of the GNN may correspond to a separate offset data network, in which each edge stores one or more relative offset values representing the differences in attribute values between the pair of nodes connected by the edge. For instance, an attribute of a particular object (e.g., a position, pose, velocity, etc.) can be stored directly by the GNN within the corresponding node for the object, or stored indirectly using offset data within the edges associated with the object, or both. To illustrate, attributes such as the position, yaw, or velocity of an entity can be stored as data associated with the entity node, in which case the attributes can be determined by directly accessing the entity node to retrieve the value. Additionally or alternatively, the position, yaw, or velocity of an entity can be stored indirectly as offset position, yaw, and velocity values within one or more edges connected to the entity node. In such examples, to determine the position, yaw, or velocity of the entity the autonomous vehicle may calculate the value for the attribute based the offset values stored by the edges and/or the absolute position, yaw, or velocity values of the other nodes connected to the same edges. For instance, the position of an object in the environment may be determined by using relative data (e.g., position offset values) within the edge data to triangulate distances from two or more other objects in the environment whose positions are known. Similar or identical techniques can be used to store and determine the yaw, pose, velocity, acceleration, size, or other any attribute of an object using relative data stored within the edges of the GNN.

In some implementations, a GNN may include weight values associated with the edges of the GNN. The weight values may be determined, using machine-learning models or heuristics-based algorithms, to correspond to a measurement of the relative effect that one object may have on another object in the environment, with respect to the predictions, navigation, and decision-making processes performed by the entities in the environment. For example, the weight value(s) associated with an edge connecting two object nodes in the GNN may be based on the types of the two objects, the distance between the two objects, and/or the relative positions of the two objects. For instance, for an entity object moving forward in the environment, the edge connecting the entity object to a distant, static object, located behind the entity, may be assigned a relatively low weight value. In contrast, the edge connecting the entity object to another object in the environment that is closer, dynamic, and/or in front of the entity, may be assigned a higher weight value. In other examples, the autonomous vehicle may determine edge weight values using various other data, including object data and/or relative data between objects, such as the object types, distances, positions, yaws, angles, velocities, trajectories, and/or the presence of any occlusions between objects. As can be understood in the context of this disclosure, these examples are non-limiting and any other machine-learning based or heuristics-based techniques may be used to determine edge weight values in other examples.

At operation 138, the autonomous vehicle may execute an inference operation to update the node states and/or edge features of the GNN, and may use an entity prediction component to determine predicted states of one or more entities based on the updated GNN. In this example, as shown in box 140, the entity prediction component has used an updated GNN state to predict a location 142 of perceived vehicle in the environment at a future time.

As noted above, the graph structure of the GNN includes nodes representing map element objects and/or entity objects, which combine to represent a current state of the environment of the autonomous vehicle. In some examples, the GNN may be a fully stateless structure that can be newly generated each time a GNN generation process is executed, based on the data currently perceived by the autonomous vehicle and the map data received by the autonomous vehicle from a map server. Additionally or alternatively, the GNN may fully or partially preserve its state during subsequent executions of the GNN generation process, in which certain object nodes, attributes, and/or edge data may be preserved from a previous version of the GNN while other data is updated. For instance, objects within the environment that were previously perceived by the autonomous vehicle but may be temporarily occluded from the sensors of the autonomous vehicle at the current time, may be retained within the GNN and/or may be updated based on the prediction data determined from the previous GNN. The GNN component may support inference operations and functionality based on machine-learning techniques, to update the nodes and/or edge features to represent a predicted future state of the environment. For instance, the inference operations performed by the GNN component to update the state of the GNN may be based entirely on a current state of the GNN. The GNN component may infer that an entity in the environment may proceed based on its current velocity and trajectory, within the constraints of the map elements and based on the influence of the other entities in the proximity of the object. As described herein, the inference operations may use machine learning techniques (e.g., trained based on driving logs and/or other training data) to determine a predicted future state of the GNN based on the current state of the GNN. The predicted future state of the GNN may correspond to updated object positions, velocities, trajectories, intents, and/or interactions that may occur between objects in the environment. Additionally, within the environment represented by the GNN, the predicted future state of one entity is often related to the predicted future states of other entities, and thus a single execution of an inference process on the GNN may provide updated node states (representing inferred future positions, velocities, trajectories, etc.) for multiple (e.g., all) entity nodes in the GNN. For such inference processes, and for other updates to the GNN that change the states of map element nodes or entity nodes, the GNN component also may perform any corresponding updates to the edge features connected to those nodes, so that the updated edge features store the accurate relative positions and/or the relative yaw values based on the nodes associated with those edge features.

As described below, updates to the nodes and edges of the GNN may be based on inference operations performed by the GNN, and/or based on new observations perceived by the autonomous vehicle. For instance, after the autonomous vehicle initially perceives an entity in the environment at a first position, first velocity, first trajectory, etc., the autonomous vehicle may perceive the entity at a different time, having a different position, velocity, or trajectory, etc. In some cases, the autonomous vehicle also may perceive attributes of map elements (e.g., positions, sizes, etc.) that are different from the map data received from the map server. The updated observations perceived by the autonomous vehicle may be provided to the GNN component, where they may be used to update the corresponding entity node(s) and/or map element nodes in the GNN, and if necessary, to propagate the updates through the edge features and/or other nodes of the GNN.

To determine a predicted state of an entity at a future time, the entity prediction component of the autonomous vehicle may retrieve node data and/or edge feature data from the updated GNN, and may decode the data to determine one or more predicted future states of the entities in the environment. A predicted future state of an entity may include, but is not limited to, a predicted position, velocity, acceleration, trajectory, yaw, pose, or any other attribute of an entity within the environment. In some implementations, the entity prediction component need not decode the entire GNN, but may select specific entities and extract/decode the corresponding node data and edge features, to perform state predictions for the selected entities.

As illustrated by these and other examples, the techniques described herein provide improvements and technical advantages for modeling, prediction, and decision-making operations in complex environments where multiple entities interact or change state relative to one another. As an example, certain conventional systems model environments and predict entity states/actions by rendering map data and entity data into an image format, and then performing predictive operations based on analyses of the image. In contrast to such systems, the techniques described herein include vectorizing map data and/or perceived entities using polylines, and storing the vectorized object representations in a GNN, thereby providing improved predictive performance without requiring rasterization of the map data or image analysis techniques on the image data representing the environment. Similarly, the GNN-based modeling techniques described herein may provide as much or more information about the environment and objects proximate the autonomous vehicle while using fewer parameters, thus supporting smaller neural networks for the machine-learning models used to make predictions, path determinations, and decision-making for the autonomous vehicle.

Additionally, unlike certain convolutional neural networks (CNNs) and GNN-based systems, the techniques described herein include edge features storing the relative positions and relative yaws between the associated nodes. As a result, an execution of a single inference process (or operation) on the GNN may output an inferred updated representation of the environment as a whole. Therefore, the techniques described herein enable predictions for multiple different dynamic objects (e.g., agents or entities) in the environment based on a single inference process, without requiring multiple inference runs and with no need to rotate or transform the graph structure of the GNN.

Further, in some examples the techniques describe herein include determining polyline representations for map elements, and applying a rotational offset to the polyline to match the predetermined orientation of a map element template (e.g., a lane template, crosswalk template, etc.). In contrast to conventional systems, the use of rotational offsets to encode and aggregate the polyline representation improves the accuracy and efficiency of the encoding process. Although certain examples herein describe using a rotational offset to canonicalize a map element to improve the encoding process, in other examples, other attributes associated with map elements and/or entity objects also may be canonicalized using similar or identical techniques. For instance, for map elements or other objects in the environment, the autonomous vehicle may determine a size offset, velocity offset, and/or other attribute offsets, instead of or in addition to determining rotational offset. Each offset may be determined by comparing the attribute value of the object in the environment to a predetermined attribute value, applying the offset before the encoding process, and storing the applied offset so that a corresponding offset can used in GNN operations and/or reapplied before the decoding process.

Figure 2:
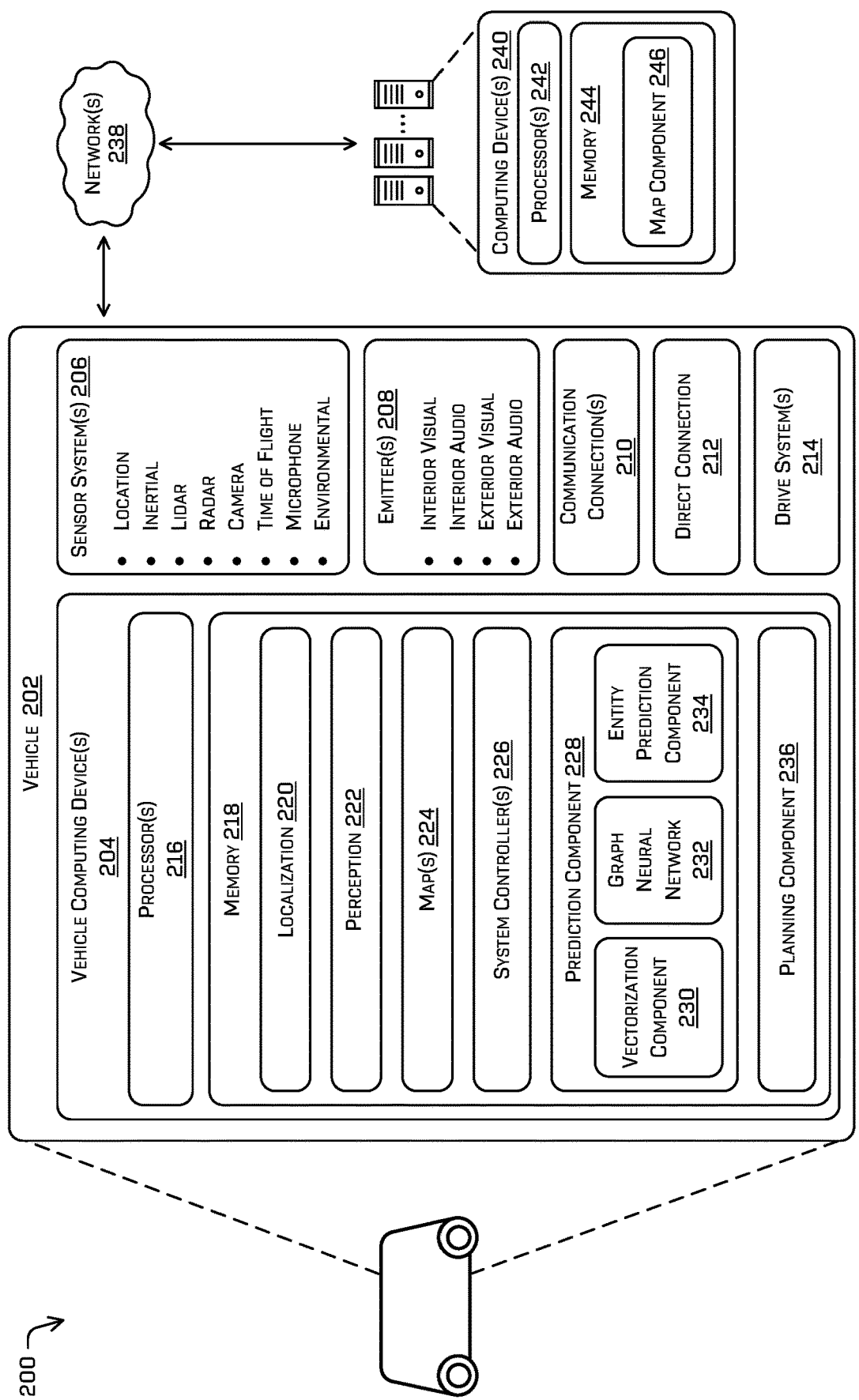
FIG. 2 depicts a block diagram of an example system for implementing various techniques described herein.

FIG. 2 depicts a block diagram of an example system 200 for implementing various techniques described herein. In at least one example, the system 200 can include a vehicle 202, which can correspond to an autonomous or semi-autonomous vehicle configured to perform object perception and prediction functionality, route planning and/or optimization. The example vehicle 202 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 can be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

In this example, the vehicle 202 can include vehicle computing device(s) 204, one or more sensor systems 206, one or more emitters 208, one or more communication connections 210, at least one direct connection 212, and one or more drive systems 214.

The vehicle computing device(s) 204 can include one or more processors 216 and memory 218 communicatively coupled with the one or more processors 216. In the illustrated example, the vehicle 202 is an autonomous vehicle; however, the vehicle 202 could be any other type of vehicle or robotic platform. In the illustrated example, the memory 218 of the vehicle computing device(s) 204 stores a localization component 220, a perception component 222, one or more maps 224, one or more system controllers 226, a prediction component 228 comprising a vectorization component 230, a GNN component 232, and an entity prediction component 234, and a planning component 236. Though depicted in FIG. 2 as residing in the memory 218 for illustrative purposes, one or more of the localization component 220, the perception component 222, the maps 224, the system controllers 226, the prediction component 228, the vectorization component 230, the GNN component 232, the entity prediction component 234, and the planning component 236 can additionally, or alternatively, be accessible to the vehicle 202 (e.g., stored on, or otherwise accessible by, memory remote from the vehicle 202).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for determining that an object is proximate to one or more crosswalk regions and/or for identifying candidate reference lines, as discussed herein.

In some instances, and in general, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, stoplight, stop sign, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 218 can further include one or more maps 224 that can be used by the vehicle 202 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 224 can include at least one map (e.g., images and/or a mesh).

In some examples, the vehicle 202 can be controlled based at least in part on the maps 224. That is, the maps 224 can be used in connection with the localization component 220, the perception component 222, the prediction component 228, and/or the planning component 236 to determine a location of the vehicle 202, identify objects in an environment, and/or generate routes and/or trajectories to navigate within an environment.

In some examples, the one or more maps 224 can be stored on a remote computing device(s), such as within the map component 246 of the computing device(s) 240, and may be accessible to the vehicle 202 via network(s) 238. In some examples, multiple maps 224 can be retrieved from the map component 246, and stored based on, for example, a characteristic (e.g., type of entity, time of day, day of week, season of the year, etc.). Storing multiple maps 224 can have similar memory requirements, but can increase the speed at which data in a map can be accessed.

In at least one example, the vehicle computing device(s) 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

In general, the prediction component 228 can include functionality to generate predicted information associated with objects in an environment. As an example, the prediction component 228 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 202 traverses an environment. In some examples, the prediction component 228 can generate one or more predicted positions, predicted velocities, predicted trajectories, etc., for such target objects based on attributes of the target object and/or other objects proximate the target object.

The vectorization component 230 can include functionality for vectorizing and storing node representations of objects in the environment. As noted above, the vectorization component 230 may vectorize various map elements stored within the map(s) 224 (e.g., roads, lanes, crosswalks, buildings, trees, curbs, medians, street signs, traffic signals, etc.), as well as any entities or other objects detected and classified by the perception component 222. To vectorize a map elements or an entity, the vectorization component 230 may define one or more polylines representing the object, where each polyline includes one or more line segments. The polylines may convey the size, shape, and position of an object (e.g., a map element or an entity perceived in the environment), and the vectorization component 230 may encode and aggregate the polylines into a node data structure (or node) representing the object.

In some examples, nodes representing the objects in an environment also may include attributes associated with the objects, and the vectorization component 230 may store the associated attributes within the node. For map element objects, the vectorization component 230 may determine various attributes from the map(s) 224 and/or external map servers, including the map element type (e.g., such road, lane, crosswalk, sidewalk, street sign, etc.) and/or subtypes (e.g., lane type, street sign type, etc.), and additional elements such as directionality (e.g., intended direction of travel), permissibility (e.g., types of entities permitted to travel on the map element), and the like. For entity objects perceived in the environment, the vectorization component 230 can receive data from the perception component 222 to determine attribute information of the entity objects over time.

In some examples, attributes of an entity (e.g., a car, a bicycle, a pedestrian, etc.) can be determined based on sensor data captured over time, and can include, but are not limited to, one or more of a position of the entity at a time (e.g., wherein the position can be represented in the frame of reference discussed above), a velocity of the entity at the time (e.g., a magnitude and/or angle with respect to the first axis (or other reference line)), an acceleration of the entity at the time, an indication of whether the entity is in a drivable area (e.g., whether the entity is on a sidewalk or a road), an indication of whether the entity is in a crosswalk region, an entity context (e.g., a presence of vehicles or other objects in the environment of the entity and attribute(s) associated with the entity), an object association (e.g., whether the entity is travelling in a group of entities of the same type), and the like.

In some examples, the attributes of an entity can be based on target object (e.g., a vehicle) and/or other object(s) (e.g., other vehicles) that are proximate the entity. For example, entity attributes can include, but are not limited to, one or more of a velocity of a nearby object at a time, an acceleration of the nearby object at the time, a position of the nearby object at the time (e.g., in global or local coordinates), a bounding box associated with the nearby object at the time (e.g., representing extent(s) of the object, roll, pitch, and/or yaw), a lighting state associated with the nearby object at the first time (e.g., headlight(s), braking light(s), hazard light(s), turn indicator light(s), reverse light(s), etc.), a distance between the nearby object and a map element at the time (e.g., a distance to a stop line, traffic line, speed bump, yield line, intersection, driveway, etc.), a distance between the nearby object and other objects, a classification of the nearby object (e.g., car, vehicle, animal, truck, bicycle, etc.), a characteristic associated with the nearby object (e.g., whether the object is changing lanes, is a double parked vehicle, etc.), and the like.

The graph neural network (GNN) component 232 can include functionality to generate and maintain a GNN including nodes representing map element objects and entity objects within the environment of the vehicle 202. As noted above, the vectorization component 230 may generate vectorized representations of map elements within the map(s) 224, and entities or other objects perceived by the perception component 222, and the GNN component 232 may store the vectorized representations as nodes in a graph structure. Additionally, the GNN component 232 may include functionality to execute inference operations on the graph structure, using machine-learning techniques to determine inferred updated states of the nodes and edge features within the graph structure.

In at least some examples, the prediction component 228 also may include an entity prediction component 234 including functionality to determine predicted states an entity stored by the GNN component 232 based on the inferred updated node and edge states of the graph structure. Predicted states for entities may include predicted locations, velocities, trajectories, orientations, and the like, at various time intervals beyond the current time. Additionally or alternatively, the prediction component 228 can include functionality to generate or otherwise determine predicted location(s) of entities in the environment with respect to other dynamic objects (e.g., agents or entities), map elements, and/or other objects. For example, the attribute data associated with an entity can be determined for one or more entities in the environment, which may include a target entity and/or other object proximate to the target entity. In some examples, attributes associated with the vehicle 202 can be used to determine predicted location(s) associated with the entities in the environment. As noted above, to perform entity predictions based on the GNN component 232, the entity prediction component 234 may include the functionality to select and decode specific portions of the GNN to determine predicted entity states, without the need to decode the entire GNN. In some examples, the predicted data determined by the prediction component 228 for an entity is not limited to predicted future attributes and states of the entity (e.g., predicted positions, velocities, trajectories, etc.), but also may include higher-level predictions such as predicted intents of entities. For instance, intent predictions for entities based on the GNN may include assessment predictions that a dynamic object at an intersection is waiting for right-of-way to proceed, is engaged in a parking maneuver, is planning to merge, is planning a left turn, right turn, or U-turn at an upcoming cross street, etc.

Although examples described herein relate to a GNN, in other examples the techniques described herein may be implemented using various other machine learned models and/or neural networks, including fully connected neural networks, convolutional neural networks, recurrent neural networks, and the like. In some examples, the GNN component 232 and/or entity prediction component 234 can be trained by based on driving data logs to determine the behaviors, movements, and/or interactions between objects in the environment, including behaviors and interactions between entities and map elements, and between entities and other entities. Such behaviors and interactions can be identified, and data representing behaviors and interactions can be identified as training data. The training data can be input to train machine learning models, which accept a current state of the GNN as input and output a predicted future state of the GNN. During the training, a known result (e.g., a ground truth, such as the known "future" attributes) can be used to adjust weights and/or parameters of the machine learning models to improve the accuracy of inferred updated GNN states and to minimize errors.

In general, the planning component 236 can determine a path for the vehicle 202 to follow to traverse the environment. For example, the planning component 236 can determine various routes and trajectories and various levels of detail. For example, the planning component 236 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 236 can generate an instruction for guiding the autonomous vehicle along at least a portion of the route from the first location to the second location. In at least one example, the planning component 236 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In some instances, the planning component 236 can generate one or more trajectories for the vehicle 202 based at least in part on predicted location(s) associated with object(s) in an environment. In some examples, the planning component 236 can use temporal logic, such as linear temporal logic and/or signal temporal logic, to evaluate one or more trajectories of the vehicle 202.

As can be understood, the components discussed herein (e.g., the localization component 220, the perception component 222, the one or more maps 224, the one or more system controllers 226, the prediction component 228, the vectorization component 230, the GNN component 232, the entity prediction component 234, and the planning component 236) are described as divided for illustrative purposes. However, the operations performed by the various components can be combined or performed in any other component. Further, any of the components discussed as being implemented in software can be implemented in hardware, and vice versa. Further, any functionality implemented in the vehicle 202 can be implemented in the computing device(s) 240, or another component (and vice versa).

In at least one example, the sensor system(s) 206 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the time of flight sensors can include individual time of flight sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device(s) 204. Additionally or alternatively, the sensor system(s) 206 can send sensor data, via the one or more networks 238, to the one or more computing device(s) 240 at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 238. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In at least one example, the localization component 220, the perception component 222, the one or more maps 224, the one or more system controllers 226, the prediction component 228, the vectorization component 230, the GNN component 232, the entity prediction component 234, and the planning component 236 can process sensor data, as described above, and can send their respective outputs, over the one or more network(s) 238, to one or more computing device(s) 240. In at least one example, the respective outputs of the components can be transmitted the one or more computing device(s) 240 at a particular frequency, after a lapse of a predetermined period of time, in near real-time, etc. Additionally or alternatively, the vehicle 202 can send sensor data to one or more computing device(s) 240 via the network(s) 238, including raw sensor data, processed sensor data and/or representations of sensor data. Such sensor data can be sent as one or more log files to the computing device(s) 240 at a particular frequency, after a lapse of a predetermined period of time, in near real-time, etc.

The computing device(s) 240 can include processor(s) 242 and a memory 244 storing a map component 246. In some instances, the map component 246 can include functionality to track the vehicle 202 and/or other vehicles operating in an environment, and to transmit map data (e.g., one or more maps 224) to the vehicles. In some examples, the map component 246 may automatically transmit updated map data the vehicle 202, in response to determining that the vehicle 202 has entered a new area or region. Additionally or alternative, the vehicle 202 may request updated maps from the map component 246, based on GPS coordinates or other location data provided by the vehicle 202.

Neural networks, such as GNNs and/or other neural networks, are algorithms which pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of GNNs and neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures that may be used to implement the techniques described herein include neural networks such as ResNet50, ResNet101, VGG, DenseNet, PointNet, and the like.

The processor(s) 216 of the vehicle 202 and the processor(s) 242 of the computing device(s) 240 can be any suitable processor capable of executing instructions to process data and perform operations as described herein. By way of example and not limitation, the processor(s) 216 and 242 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 244 are examples of non-transitory computer-readable media. The memory 218 and 244 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 240 and/or components of the computing device(s) 240 can be associated with the vehicle 202. That is, the vehicle 202 can perform one or more of the functions associated with the computing device(s) 240, and vice versa. Further, aspects of the prediction component 228 (and subcomponents) can be performed on any of the devices discussed herein.

Figure 3A:
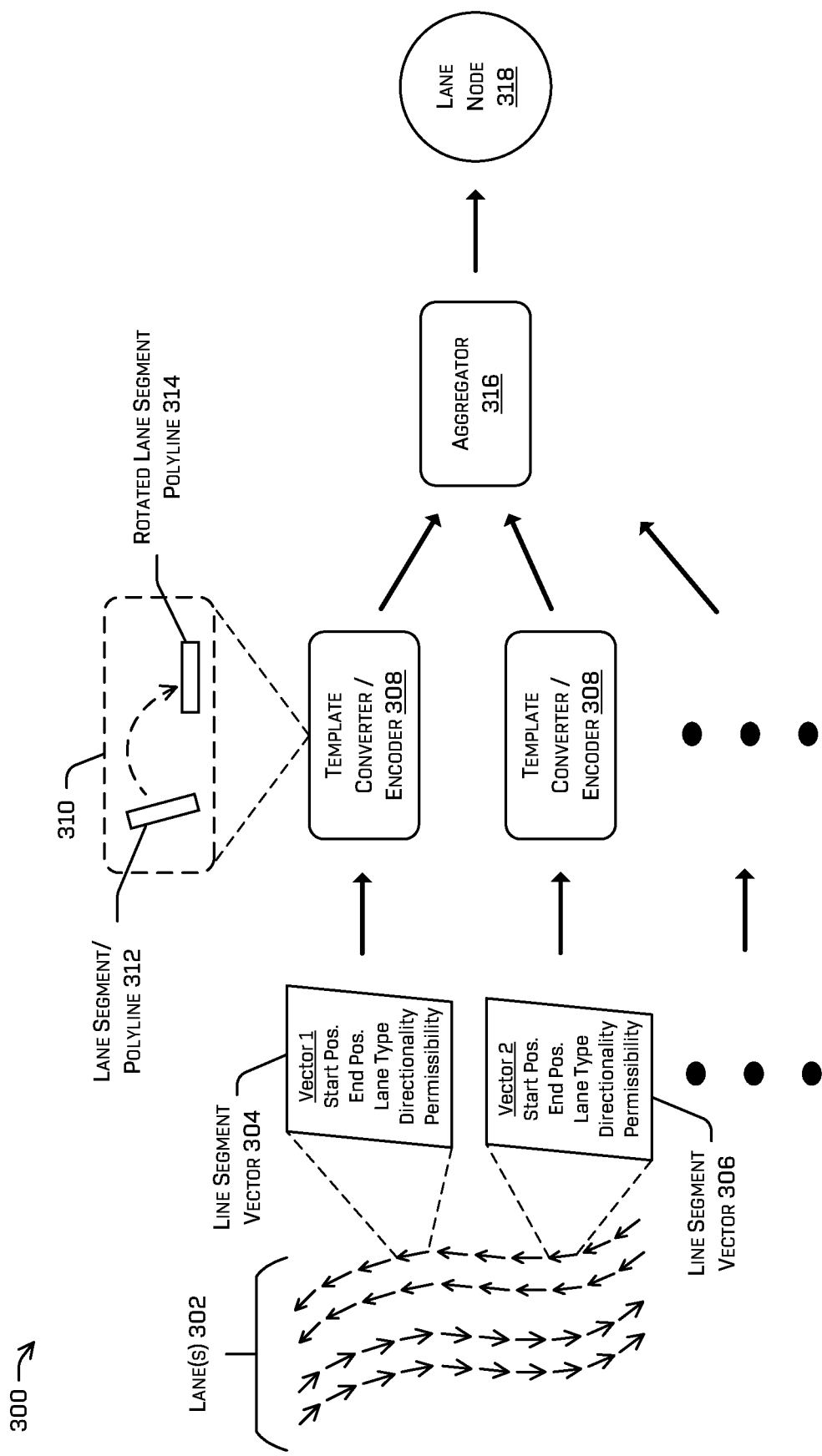
FIGS. 3A-3C illustrates techniques for vectorizing map elements and generating nodes storing encoded map element data, in accordance with one or more implementations of the disclosure.
Figure 3B:
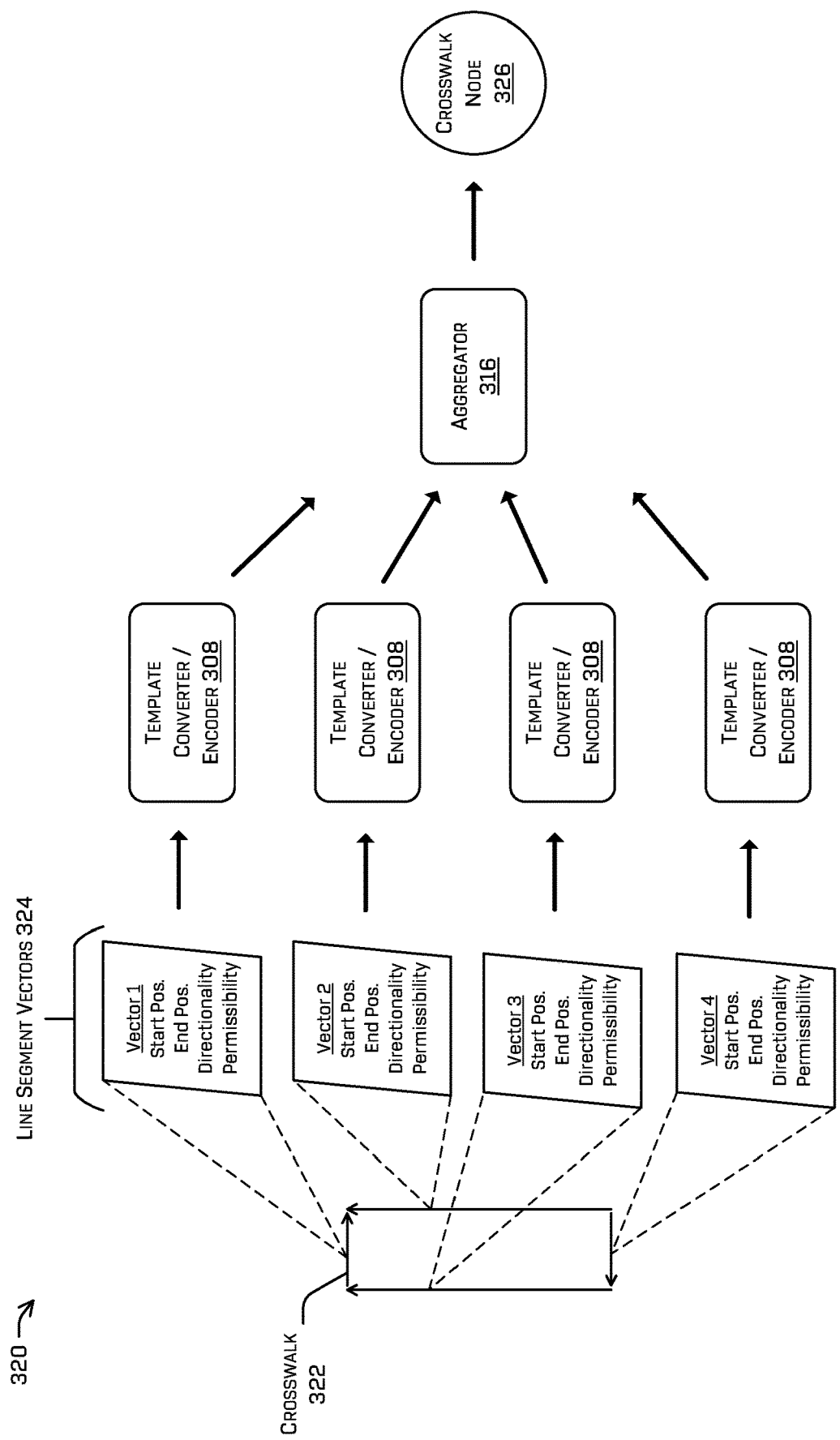
Figure 3C:
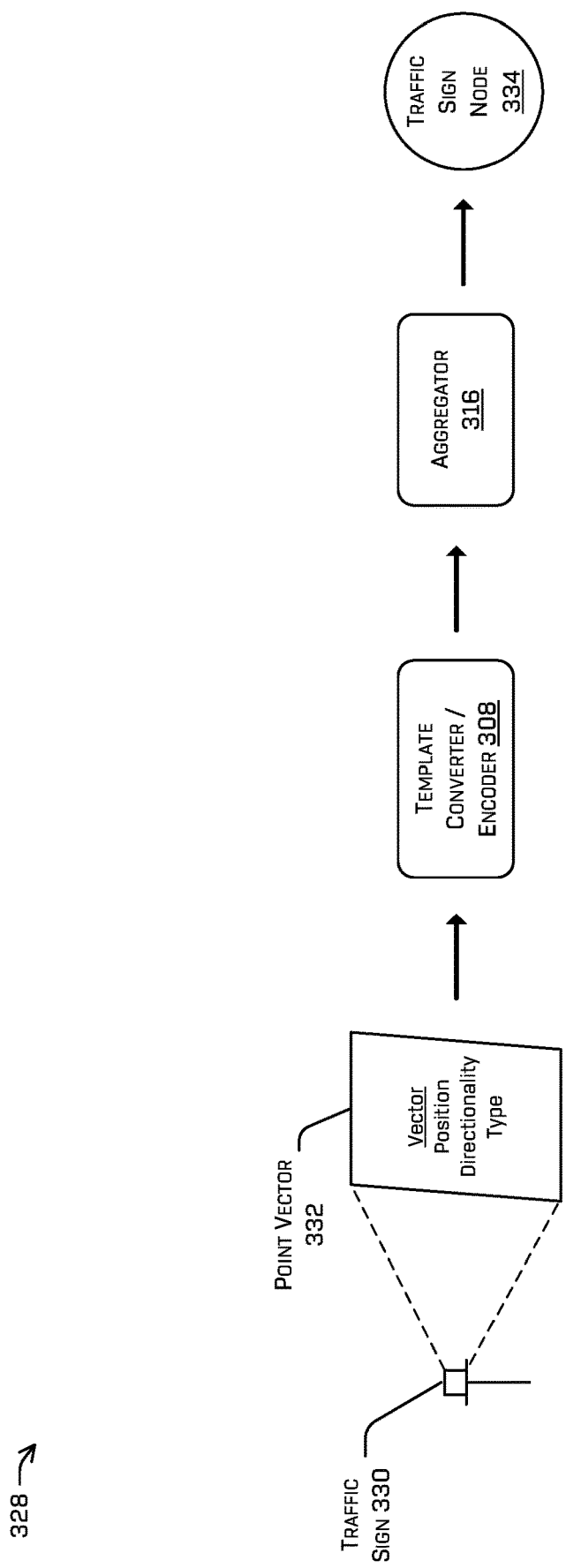

FIGS. 3A-3C depict techniques including vectorization and/or node generation processes for three map elements. In some examples, the techniques illustrated in FIGS. 3A-3C may be performed may a vectorization component 230 and/or GNN component 232 within an autonomous vehicle 202, based on map data representing the environment in which the vehicle is operating. The map data used by the vectorization component 230 may include data from one or more map(s) 224 stored locally within the autonomous vehicle 202, and/or map data received from a remote computing device 240. In various implementations, the techniques for vectorizing map elements and generating GNN nodes may be the same for all map elements, and/or may be different based on the type of the map elements. In these examples, FIG. 3A depicts a process for vectorizing a lane object, FIG. 3B depicts a process for vectorizing a crosswalk object, and FIG. 3C depicts a process for vectorizing a lane object, and FIG. 3C depicts a process 320 for vectorizing a street sign object.

As shown in FIG. 3A, the vectorization component 230 may identify one or more lanes 302 within the map data, and may determine a polyline (or group of polylines) to represent each lane. In some examples, the map(s) 224 stored on the autonomous vehicle may identify lanes, including the position, dimensions, shape and/or direction of the lanes. Additionally or alternatively, the vectorization component 230 may identify and classify lane objects based on the map data by detecting predetermined visual patterns associated with lanes and/or using machine-learning techniques to detect lanes within the map data.

For one or more lanes 302 identified in the map data, the vectorization component 230 may determine a polyline (e.g., a set of connecting line segments) to represent each lane. In some example, lanes 302 can be represented one-dimensionally as a set of line segments connected end-to-end that track the route of the lane. Polylines defining a set of end-to-end connected line segments may be used to represent straight and/or curved lanes, and in some cases the vectorization component 230 may determine the length of the line segments based on the curvature of the lane(s) 302. For instance, a sharply curved lane may be broken into a larger number of short line segments in order to better represent the path of the lane, while a straighter lane may be broken into a fewer number of long line segments. Additionally or alternatively, lanes 302 may be represented as two-dimensional polygons formed by connecting line segments to define a lane shape. In the above examples, a polyline representing a lane may include a group of associated line segments, which either may be connected end-to-end or arranged in a polygonal shape. As shown in FIG. 3A, each line segment may be expressed as a vector that defines the dimensions of the line segment and/or other attributes associated with the lane 302. For instance, line segment vectors 304 and 306 represent the vectors for two separate line segments of the same lane 302, and each line segment vector 304 and 306 stores a start position and end position of the respective line segment. Line segment vectors 304 and 306 also may include additional attributes of the lane, including a lane type, a directionality attribute, and a permissibility attribute.

Each of the individual line segment vectors representing the lane 302 may be provided to a template converter/encoder 308 of the vectorization component 230. As shown in this example, the template converter/encoder 308 may be implemented into a single system, network, etc., but in other examples a template converter and encoder may be implemented separately. In some cases, each line segment vector may be provided separately to the template converter/encoder 308, while in other cases the associated line segment vectors for a lane object (or other map element) may be provided as a group to the template converter/encoder 308. The template converter/encoder 308 in this example may include the functionality to match the map element (e.g., lane) to an associated map element template (e.g., a lane template). Based on the matching, the template converter/encoder 308 may convert the individual line segment vectors 304 and 306 into vectors complying with the map element template. As shown in box 310, in some cases the template converter/encoder 308 may determine a rotational offset between a lane segment and/or polyline 312 based on a template, and may convert segment and/or polyline to a rotated lane segment and/or polyline 314 that corresponds to the predetermined orientation of the template.

The template converter/encoder 308 in this example also may perform one or more encoding operations on the line segment vectors 304 and 306. In various implementations, the conversion of the line segment vectors based on the template (e.g., into a canonical local frame) may be performed before or during the encoding operations. As noted above, the conversion of the polylines into a canonical local frame may improve the efficiency and accuracy of the encoding process. Although in this example the templatization conversion (or canonicalization) includes rotating the polyline, other examples the polyline may be resized and/or reshaped to more closely fit into a map element template, to further improve the encoding process. When the template converter/encoder 308 rotates a polyline as shown in box 310 (or performs another type of conversion), the rotational offset (or other conversion data) may be preserved so that it can be returned to its original form during the decoding process. For instance, as described below, the rotational offsets (or other conversion data) for polyline map elements that result from canonicalization may be stored within the node representing the map element within a GNN, and/or within the associated edge features connected to the node.

In some examples, an aggregator 316 of the vectorization component 230 may be used to aggregate the encoded line segment vectors representing the lane(s) 302. As this example illustrates, after the individual line segments within a polyline representing a lane are vectorized, converted, and/or encoded, the vectorized/encoded line segment data may be aggregated by the aggregator 316, and the resulting data may be stored as a lane node 318. In some examples, the data structure of the lane node 318 may be configured to store the aggregation of each vectorized/encoded line segments of the lane polyline, as well as one or more additional attributes associated with the lane. In some cases, attributes applicable to lane map elements, including but not limited to the lane type, directionality, and permissibility, may be vectorized and encoded along with the line segment data. Additionally or alternatively, these attributes might not be vectorized and encoded, but may be retained as lane attributes associated with the lane node 318, which may be stored as an attribute or metadata to the lane node 318, and/or in a separate storage associated with the lane node.

FIG. 3B illustrates a similar process 320 in which the vectorization component 230 identifies a crosswalk 322 within the map data, generates a vectorized representation of the crosswalk 322, and then creates a node data structure to represent the crosswalk 322 in an GNN. Similar to the example process 300 described above, process 320 includes determining and vectorizing a polyline representing the crosswalk 322. In this example, the polyline for the crosswalk 322 includes four line segments connected rectangularly, and the vectorization component 230 may generate a set of line segment vectors 324 to represent each of the four line segments.

The line segment vectors 324 may be converted and encoded using similar or identical techniques and components to those discussed in connection with FIG. 3A. For instance, the template converter/encoder 308 may match the crosswalk 322 to a crosswalk template, and may modify or convert the polyline of the crosswalk 322 based on the crosswalk template. In some examples, the line segment vectors 324 may be rotated, individually or as a group, by the template converter/encoder 308, so that the yaw/orientation of the crosswalk 322 matches a predetermined orientation of the crosswalk template. In such examples, the line segment vectors 324 may be rotated before the encoding by the template converter/encoder 308, and a value indicating the amount of the rotation (e.g., the rotational offset) may be stored within the crosswalk node 326 and/or edge features of the GNN connected to the crosswalk node 326. After converting and/or encoding the line segment vectors, the vectorization component 230 may use the aggregator 316 to aggregate the vectorized and encoded line segments into the crosswalk node 326.

FIG. 3C illustrates another similar process 328 in which the vectorization component 230 identifies a traffic sign 330 (e.g., a stop sign, yield sign, school zone sign, speed limit sign, merge sign, etc.) within the map data, generates a vectorized representation of the traffic sign 330, and then creates a node data structure to represent the traffic sign 330 in an GNN. In this example, the traffic sign 330 may be represented by a single point rather than a polyline, and process 328 may include vectorizing the point representation the traffic sign. As shown in this example, the traffic sign 330 is represented by a single point vector 332 including the attributes such as the position, the type, and the directionality of the traffic sign 330. The point vector 332 may be converted and/or encoded using similar or identical techniques and components to those discussed above. After converting and/or encoding the point vector 332, the vectorization component 230 may use the aggregator 316 to aggregate the encoded point vector 332 and generated the traffic sign node 334. Although the traffic sign node 334 in this example represents a single traffic sign 330, in other examples a single node may represent multiple related traffic signs, traffic lights, etc., in the environment. In some examples, traffic signs and signals may be considered point objects and might not be vectorized using the same technique of aggregating polylines. Additionally, in some cases traffic signs and signals might not be represented as nodes within the GNN, but instead may be represented as attributes associated with other map elements (e.g., a stop sign attribute associated with a lane segment or crosswalk object, etc.).

Figure 4:
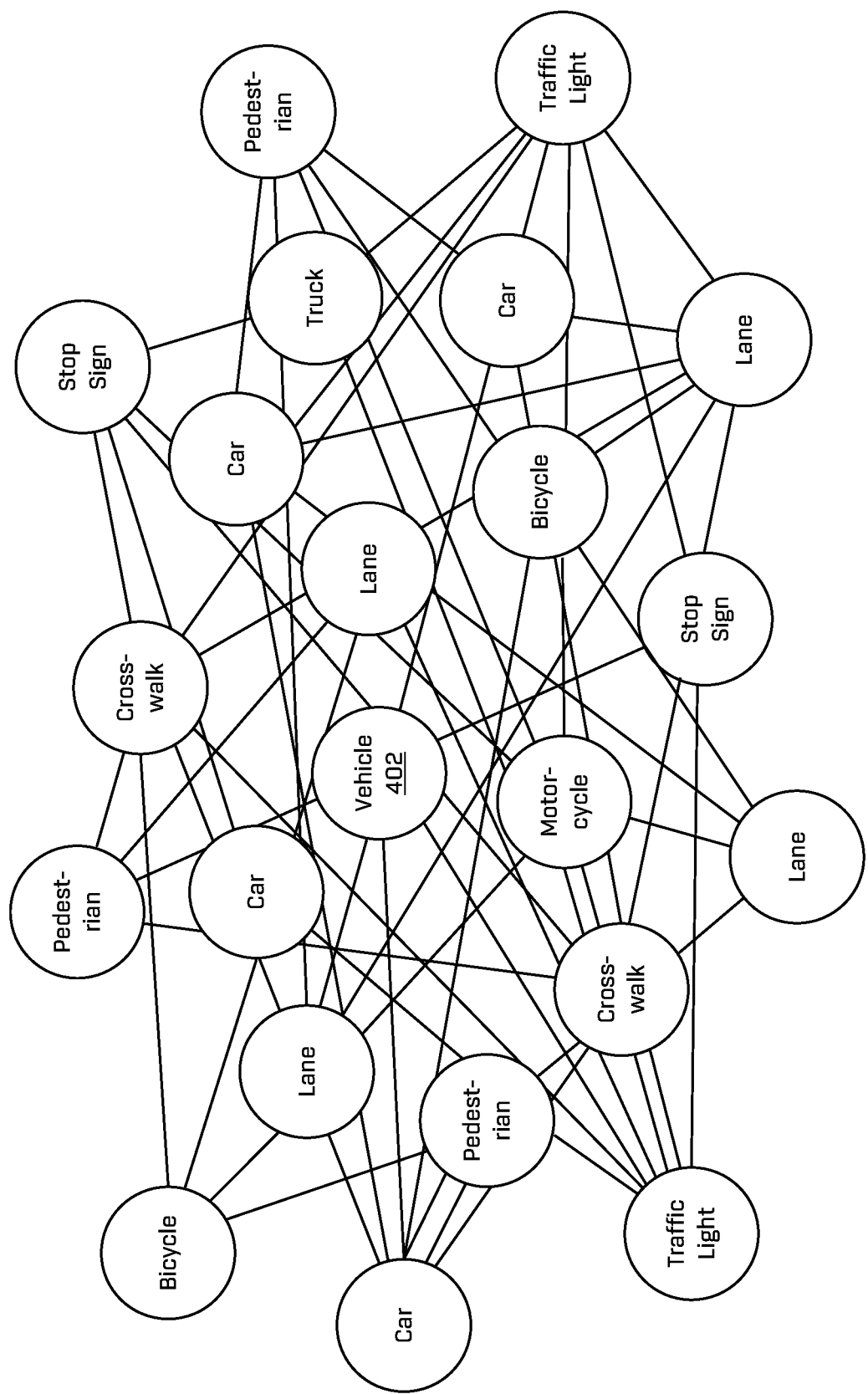
FIG. 4 depicts an example graph structure including nodes storing map element data, nodes storing entity data, and edges storing edge feature data associated with node pairs, in accordance with one or more implementations of the disclosure.

FIG. 4 depicts an example graph structure 400 including a number of nodes representing different objects within a physical environment. As shown in this example, the graph structure 400 includes a node representing the autonomous vehicle 402, a number of nodes representing various map elements (e.g., lanes, crosswalks, stop signs, etc.) based on map data, and nodes representing various entities (e.g., cars, trucks, bicycles, pedestrians, etc.) perceived by the autonomous vehicle 402. Accordingly, the graph structure 400 may represent a current environment in which autonomous vehicle 402 is operating, based on combined data from one or more map(s) 224 and entities perceived via the sensor system(s) 206 and perception component 222. As noted above, the graph structure 400 may represent a portion of a GNN and may be included in a GNN component 232, along with other functional components of the GNN to maintain the graph structure 400, process and propagate updates, run inference processes, etc.

The graph structure 400 includes a number of edges (or edge features), where each edge connects a pair of nodes. As discussed above, each edges of the graph structure 400 may store the data indicating the relative position and/or relative yaw between the endpoint nodes associated with the edge. Accordingly, in some examples, the GNN component 232 may design the graph structure 400 such that each node stores the non-relative information about an object, and the edges connected to that node store the relative information (e.g., relative position, relative yaw, etc.) associated with the object and the other objects in the environment. For clarity not all edges are depicted in this example, and in some cases the graph structure 400 may be a fully connected structure including a unique edge associated with each distinct pair of nodes. In such examples, the node representing the autonomous vehicle 402 may have an edge feature connected to autonomous vehicle 402 to every other node within the graph structure 400. Additionally, although the graph structure 400 in this example illustrates a GNN that includes the autonomous vehicle as a node 402, in other examples a graph structure associated with a GNN and/or other neural network structures may be constructed to represent an environment without including a node for the autonomous vehicle.

As noted above, the graph structure 400 depicted in FIG. 4 may be fully connected in some cases, so that a distinct edge (and corresponding edge data/features) is associated with each unique pair of nodes in the GNN. In other examples, the graph structure 400 may be implemented as a partially connected graph, in which the GNN component 232 groups object nodes, and/or adds and removes edges between nodes based on the attributes of the object, relative data, or other criteria. In some implementations object nodes within the GNN that are similar in type and/or near to each other in the environment may be grouped into a subgroup within the GNN. For instance, a set of adjacent lane objects, or a number pedestrians standing/walking near each other, may be grouped into node group within the GNN. Within a node group, each object node (e.g., a lane node, pedestrian node, etc.) may be similar or identical to the object nodes described above. However, in some cases, individual nodes within a node group might not have edges connecting the individual node to other objects outside of the node group. Instead, each node in the group may have an edge connecting it to other nodes in the group, but only a single edge may be used to connect to node group as a whole to the other the node objects in the GNN. To illustrate, the node representing the autonomous vehicle 402 may be connected via a first edge to a node representing a vehicle, and connected via a second edge to a node group representing a lane grouping, a pedestrian grouping, or another grouping of similar objects located in the same relative position with respect to the autonomous vehicle.

Nodes and/or edges may be added, removed, and modifies from the graph structure 400 overtime as the autonomous vehicle 402 operates in the environment. For example, when the autonomous vehicle 402 receives new map data from an external server and/or internal map(s) 224, the autonomous vehicle 402 may identify map elements and generate vectorized representations of the map elements, which may be stored as nodes in the graph structure 400 of a GNN. Similarly, the autonomous vehicle 402 perceives new entities within its environment, it may classify the entities, generate vectorized representations of the entities, and store the representations as nodes in the graph structure 400.

Additionally, in some examples, the GNN component 232 may include functionality to cull or remove nodes from the graph structure 400. For instance, the GNN component 232 may perform a horizon-culling function in some cases, in which nodes greater than a certain distance away from the autonomous vehicle 402, and/or nodes having an edge weight value less than a threshold value with respect to the autonomous vehicle 402, are removed from the graph structure 400. In such cases, the GNN component 232 may periodically analyze the edge features connected to the autonomous vehicle 402 to determine the weight values and/or relative distances of each object from the autonomous vehicle 402, and may remove any nodes representing objects less than threshold relevance metric (e.g., using the weight value) and/or farther than a threshold distance away from the autonomous vehicle 402. Additionally, in some instances if an entity object is occluded or other obscured from detection by the autonomous vehicle 402 for a period of time greater than a threshold time, then the GNN component 232 may determine that the entity is no longer relevant to the environment of the autonomous vehicle 402 and may remove the entity node from the graph structure 400. In some instances, the threshold occlusion time for removing an entity node from the graph structure 400 may be several seconds or longer, in order to prevent removing nodes of nearby entities that are only temporary occluded from perception by the autonomous vehicle 402.

Figure 5:
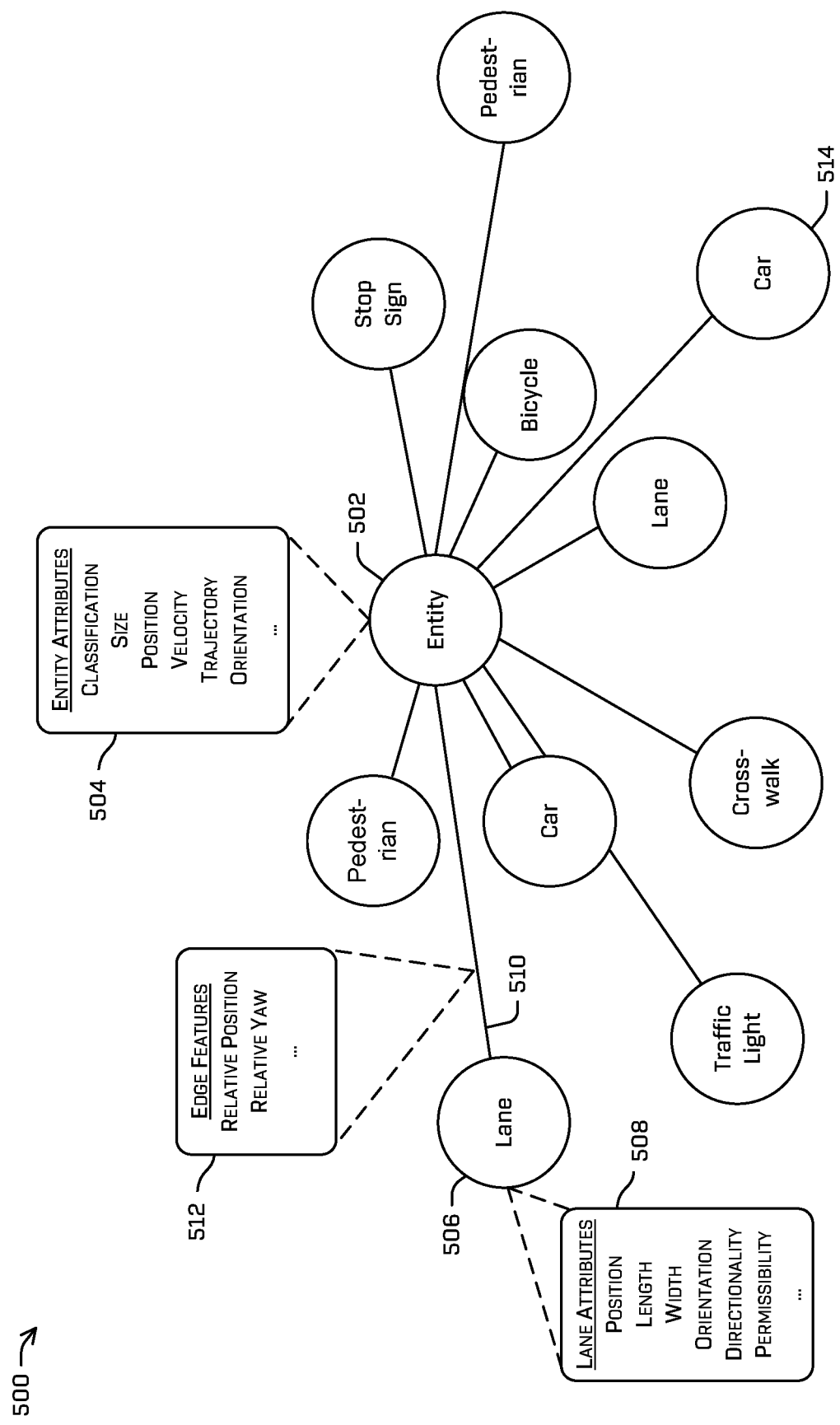
FIG. 5 depicts another example graph structure including an entity node and a plurality of connected nodes representing objects in an environment, in accordance with one or more implementations of the disclosure.

FIG. 5 depicts another example graph structure 500 including nodes representing different objects in a physical environment. The graph structure 500 may represent a portion of the graph structure 400 described above, or may represent a separate graph structure associated with a separate GNN. In this example, the graph structure 500 includes a number of nodes representing entities, and additional nodes representing map elements. As described above, both entity nodes and map element nodes may be vectorized and stored as nodes in the GNN using similar techniques. For instance, both entity nodes and map element nodes may include position data, size data, and/or orientation data, which allows the GNN component 232 to define edge features storing the relative distance and/or relative yaw between the node objects connected by the edge.

Entity 502 is represented as a node in this example and is shown with edges connected to each additional node in the graph structure 500. Although the graph structure 500 in this example only depicts the edges associated with the entity 502, in other examples the graph structure 500 may be a fully connected structure including additional nodes and/or edges. The entity 502 may represent, for instance, a car, truck, pedestrian, bicycle, or an autonomous vehicle. Attribute list 504 includes a listing of attributes associated with the entity 502, including an object classification, size, position, velocity, trajectory, and orientation. As noted above, the entity 502 is connected by an edge to every other node in the graph structure 500, including both map element nodes and other entity nodes. In this example, the entity 502 is connected to a lane 506 represented as a map element node, via an edge 510. An attribute listing 508 associated with the lane 506 includes the lane position, length, width, orientation, directionality, and permissibility. As a map element node, the lane 506 does not include attributes such as a velocity or trajectory. However, similar vectorization techniques may be used to define polylines, and vectorize and encode the line segments, so that both map element nodes and entity nodes may be represented in the graph structure 500 of a GNN. In this example, edge 510 stores a listing of edge features 512, including data indicating the relative position and relative yaw between the entity 502 and the lane 506. Some attributes may be stored as node attributes in some instances, and/or edge features in other instances. For instance, permissibility can be an attribute of lane object indicating the direction(s) of travel of the lane and/or types of objects that may use the lane. In other example, permissibility may an edge feature of an edge connecting an entity with a map feature such as a crosswalk, in which the permissibility edge feature may toggle depending on a traffic signal and/or right-of-way determination to indicate whether the entity is permitted to enter the crosswalk at the time represented by the current state of the GNN.

As the autonomous vehicle and/or other entities operate and move in the environment, the GNN component 232 may add, remove, and modify nodes and edges of the graph structure 500 the represent the updated environment. In some examples, the GNN component 232 may update one or more of the attributes associated with the entity 502, based on inference processes performed by the GNN component 232 to determine an update state of the graph structure 500, and/or based on updated observations from an autonomous vehicle or other sensor systems within the environment. For instance, if an inference process of the GNN component 232 or an updated observation from a sensor system determines a new position associated with the entity 502, the attribute listing 504 associated with the entity 502 may be updated to indicate the new position. Additionally, based on the new position of the entity 502, the GNN component 232 may update each of the edges connected to the entity 502, to represent the updated relative distance between the entity and the other objects represented in the graph structure 500. Similarly, if an inference process and/or updated observation data determines a new orientation for the entity 502, the GNN component 232 may update each edge to represent the updated relative yaw values between the entity 502 and other objects.

Although the above example describes the nodes and edges associated with a single central entity 502 in the graph structure 500 for illustrative purposes, it is to be understood that a GNN need not have any central entity. Instead, the graph structure 500 can include any decentralized arrangement of nodes representing map elements and/or entities, along with an edge network defining a fully connected or partially connected graph structure 500. The operations described above with respect to entity 502 can be similarly performed for any other nodes in the graph structure 500 or other GNN. As an example, if the position, yaw, and/or other attributes of the car 514 are updated based on inference processes or new observation data, the node attributes associated with the car 514 may be updated, and the corresponding updates to the relative positions and relative yaws may be propagated to each edge connected to the car 514.

In addition to propagating updates to entity nodes via edges, similar techniques may be used to retrieve, decode, and use the node attributes and edge features of a GNN to predict entity states. For example, to perform a predictive analysis for a particular entity or set of entities within an environment, the entity prediction component 234 may retrieve and decode the portions of the graph structure 500 related the particular entity or entities. For instance, if a request has been received to predict an updated attribute for the entity 502 (e.g., an updated position, velocity, acceleration, trajectory, orientation, yaw, etc.) at a specified future time, then the entity prediction component 234 may access the portions of the graph structure 500 at and/or adjacent to the entity 502 to retrieve and decode the relevant data to perform the predictive analysis. In this example, after an inference process has been executed by the GNN component 232 to update the state of the graph structure 500, the entity prediction component 234 may retrieve the attribute list 504 for the entity 502, and may traverse the edges to retrieve relevant state data from any connected node and/or to retrieve the relative position and yaw data from the edges. Such techniques may allow the GNN component 232 and/or entity prediction component 234 to retrieve, decode, and use updated state data from the graph structure 500 in a limited and target way, without the need to decode the complete graph structure 500.

In various examples, the propagation of updates through the graph structure 500, and/or the propagation of data retrieval and decoding operations targeting a specific node or portion of the graph structure 500, may be based on the node attributes and/or edge features. For instance, certain state or behaviors associated with one entity may cause propagating effects to other nearby entities. However, in some implementations, the GNN component 232 may control the propagation effects based on relative distance and/or relative yaw between objects, or based on the entity type, etc. Additionally, a targeted predictive analysis for a particular entity or set of entities in the environment may include a similar propagation by the GNN component 232, in which the nodes near the particular entity may be retrieved and decoded for use in the predictive analysis. However, in some implementations, the GNN component 232 may control the propagation of the data retrieval and decoding based on relative distance and/or relative yaw between objects, or based on the entity type, etc.

In some examples, using the GNN to determine predicted data associated with an entity in the environment may include retrieving and decoding portions of the GNN based on edge connections and/or weight values, and using the decoded portions of the GNN as input to a machine-learning model configured to predicted data associated with the entity. For instance, when a GNN is partially connected, the GNN component 232 may retrieve and decode the first-level connected nodes (e.g., directly connected) for an entity, and the corresponding edge data, and may decode the node and edge data to use as input to determine predicted data for the entity. Additionally or alternatively, for fully connected or partially connected GNNs, the GNN component 232 may retrieve and decode a subset of the node data and/or edge data connected to an entity node, based on the weight values associated with the edge. As discussed above, for an entity traversing an environment, the weight values in the GNN for the edges connecting that entity to other objects in the environment may be based on the relevance of the other objects with respect to predictions, trajectories, and decisions made by the entity within the environment. When determining predicted data for an entity, in some cases the entity prediction component 234 may retrieve, decode, and use data representing other objects for which the edge weight value between the entity and the other objects meets or exceeds a weight threshold. Additionally or alternatively, the entity prediction component 234 may adjust or otherwise determine a weight the input to the predictive models or heuristics algorithms to predict data based on the edge weight values. In these examples, the entity prediction component 234 may use the edge weight values to determine data predictions for entities in the GNN, based on a relevant subset of other object nodes and by excluding less relevant nodes, thereby reducing computing resources and improving efficiency of the prediction and decision-making operations within the autonomous vehicle.

Figure 6:
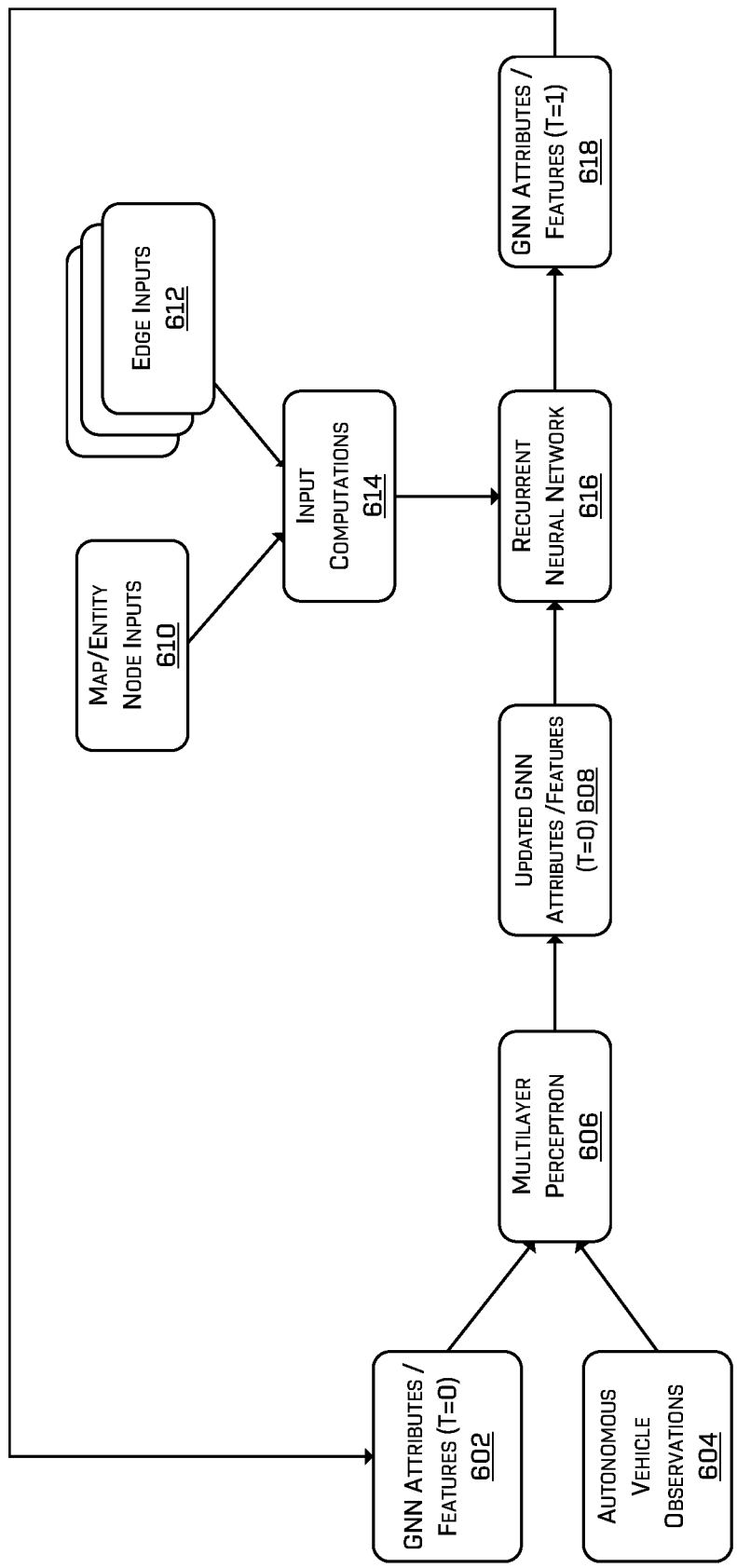
FIG. 6 illustrates an example system for updating a graph neural network representing an environment of an autonomous vehicle, in accordance with one or more implementations of the disclosure.

FIG. 6 illustrates an example system 600 for updating a GNN representation of an environment in which an autonomous vehicle is operating. As described above, a GNN representing the physical environment of an autonomous vehicle may include a combination of map element nodes, entity nodes, and edge features connecting the nodes and storing relative position and/or relative yaw values. In some cases, the GNN representation of the environment may be updated based on machine learning inference processes that may be performed to update the nodes, attributes, and edges of the GNN based partially or entirely on input computations from the GNN itself. Additionally or alternatively, the GNN representation may be updated based on new observations perceived by the sensor systems or perception systems of the autonomous vehicle, such as observations of new positions, velocities, trajectories, etc., for itself or any other entity within the environment.

In this example, element 602 includes the current state of the GNN at a first point in time (e.g., t=0). The current state data in element 602 may include the attributes and/or features associated with the nodes and/or edges in the GNN structure. For instance, element 602 may include the objection classifications, positions, velocities, trajectories, and other attributes for all entities within the environment, as well as the locations and orientations of all map elements within the environment. Element 604 includes one or more new observations perceived by the autonomous vehicle for one or more entities in the environment. For instance, after the autonomous vehicle initially perceives an entity in the environment at a first position, first velocity, first trajectory, etc., the autonomous vehicle may perceive the entity at a different time, having a different position, velocity, or trajectory, etc. The GNN may include multilayer perceptron 606 to incorporate the new observations from element 604 into the current state data in element 602, including updating nodes, edges, and propagating updates within the GNN, to produce an updated current state of the GNN at the first point time in element 608.

Element 610 includes a set of inputs to an inference process based on the map element nodes and entity nodes within the GNN, and element 612 includes an additional set of inputs to the inference process based on edge features. At element 614, the GNN executes the inference process (or processes) based on the node inputs in element 610 and edge inputs in element 612. The output of the GNN inference process of element 614 is provided to a recurrent neural network (RNN) 616, along with the updated current state of the GNN at element 608. The RNN 616, which may be implemented using various other machine learned models and/or neural networks in other examples, may apply the results of the GNN inference process of element 614 to the updated current state of the GNN at element 608, to produce as output an updated future state (e.g., t=1) of the GNN at element 618. The RNN 616 may retain at least a portion of the state of the GNN. As shown in this example, the updated future state of the GNN at element 618 may be fed back as an input to element 602 in subsequent updating of the GNN representation of the environment.

Figure 7:
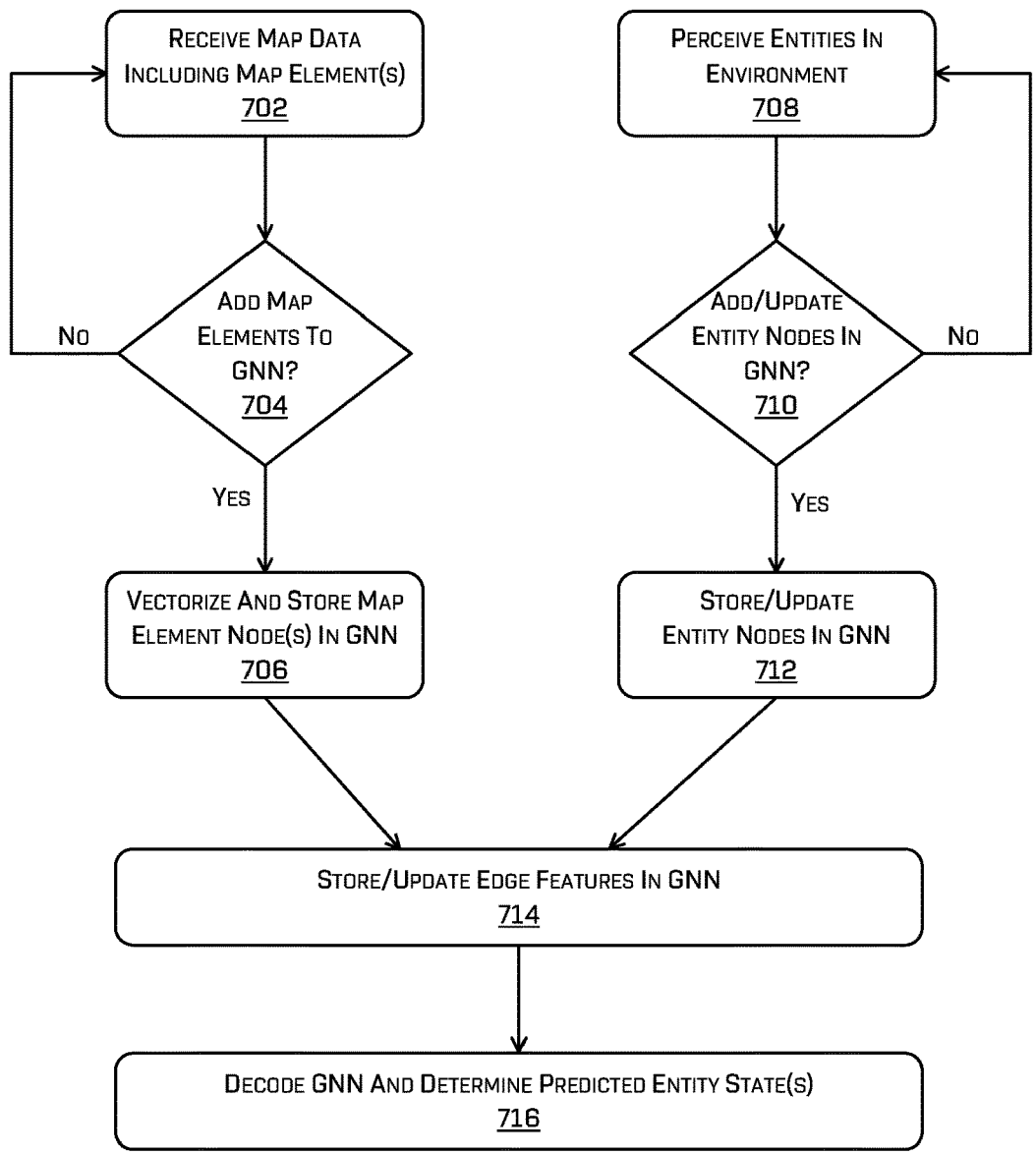
FIG. 7 is a flow diagram illustrating an example process of generating and using a graph neural network of vectorized objects to represent an environment of an autonomous vehicle and predict entity states, in accordance with one or more implementations of the disclosure.

FIG. 7 is a flow diagram illustrating an example process 700 of generating and using a GNN to represent an environment of an autonomous vehicle and predict entity states in accordance with the various systems and techniques discussed above. In some examples, the operations of process 700 may be performed by one or more components of an autonomous vehicle, such as a prediction component 228 comprising a vectorization component 230, a GNN component 232, and/or an entity prediction component 234 as described herein.

Process 700 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 702, the autonomous vehicle may receive map data including one or more map elements within the physical environment of the autonomous vehicle. For instance, the map data can include various geographic data listings and/or data structures received from the maps 224 within the autonomous vehicle or from an external computing device(s) 240 such as map servers. The map elements may include, for example, data indicating roads, lanes, curbs, trees, shoulders, crosswalks, buildings, trees, medians, street signs, traffic signals, speed limits, etc.

At operation 704, the autonomous vehicle may determine whether or not to add the map elements received in operation 702 to an existing GNN representation of the environment. In various examples, the GNN component 232 may determine whether or not to add the map element as a new node to the GNN based on whether that map element is already represented in the GNN. Additionally or alternatively, the GNN component 232 may determine whether or not to add the map element based on the distance of the map element from the current position of the autonomous vehicle and/or the planned trajectory or route of the autonomous vehicle. In some cases, the GNN component 232 also may determine whether or not to add a map element to the GNN based on the type (or classification) of the map element. For instance, the GNN component 232 may construct different GNN to store different types of map elements and/or entities, or may exclude certain types of map elements that may be less relevant to the specific predictive analyses for which the GNN is configured to perform.

If the GNN component 232 determines in operation 704 that the map element(s) are not to be added to the GNN (704: No), then process 700 may return to operation 702 to await additional map data. As noted above, in some cases the autonomous vehicle may request and/or receive updated map data in response to driving into a new physical area or region. However, if the GNN component 232 determines in operation 704 that the map element(s) is to be added to the GNN (704: Yes), then at operation 706 one or more nodes may be generated based on the map elements and added to the appropriate graph structure(s) of the GNN. As described above, the vectorization component 230 may define one or more polylines representing the map features, vectorize the individual line segments of the polylines, convert and/or encode the vectorized polylines, and then aggregate the encoded polylines into a node data structure compatible with the GNN.

As shown in this example, the group of operations 702-706 may execute separately and independently from operations 708-712. In some cases, operations 708-712 may execute before operations 702-706, and either group of operations may execute multiple times and/or asynchronously with respect to the other group of operations. At operation 708, the autonomous vehicle perceives one or more entities (e.g., cars, trucks, bicycles, pedestrians, etc.) in the physical environment in which the vehicle is operating. In some examples, the sensor systems and/or object perception systems of the autonomous may detect and classify nearby objects in the environment. In addition to dynamic objects such as cars, bicycles, pedestrians, etc., in some cases the entities perceived in operation 708 may include environmental conditions affecting visibility or driving (e.g., rain, fog, snow, ice, etc.) or the state of traffic lights/signals (e.g., the current color of a green-yellow-red traffic signal) which may not be present within map data.

At operation 710, the autonomous vehicle may determine whether or not to add or update nodes in the GNN based on the entities perceived in operation 708. In various examples, the GNN component 232 may determine whether or not to add or update an entity node into the GNN based on various factors, such as whether or not a node already exists for the entity, the amount by which one or more entity attributes (e.g., position, velocity, trajectory, etc.) have changed from what is stored in the GNN for that entity node, the distance of the entity from the autonomous vehicle and/or the planned trajectory or route of the autonomous vehicle. In some cases, the GNN component 232 also may determine whether or not to add a map element to the GNN based on the type (or classification) of the entity.

If the GNN component 232 determines in operation 710 that an entity node is not to be added or updated to the GNN based on the perceived entities (710: No), then process 700 may return to operation 708 to await additional perception data from the sensor and perception systems of the autonomous vehicle. However, if the GNN component 232 determines in operation 710 that a new entity node is to be added to the GNN or an existing entity node is to be updated (710: Yes), then at operation 712 one or more entity nodes may be generated and/or updated based on the perceived entities, within the appropriate graph structure(s) of the GNN. As described above, to add a new entity node to the GNN, the vectorization component 230 may define one or more polylines representing the entity, vectorize the individual line segments of the polylines, convert and/or encode the vectorized polylines, and then aggregate the encoded polylines into a node data structure compatible with the GNN.

At operation 714, the GNN component 232 may determine edge feature data and generate and/or update any edge features necessary based on any nodes added or updated in operations 706 and/or 712. In some examples, for any new node and/or when the position or orientation of an existing entity node changes, the GNN component 232 may determine updated relative positions values and/or updated relative yaw values for each edge connected to the affected node.

At operation 716, the entity prediction component 234 may use the GNN to determine a predicted future states for one or more entities represented in the GNN. As described above, the GNN may be configured to execute one or more inference process to update the node states and/or edge features of the GNN, providing an inferred (or predicted) future state representation for all of the objects in the environment. In some examples, entity prediction component 234 may access the updated state of the GNN, retrieve and decode one or more portions of the updated GNN, and use the updated GNN data determine predicted entity states. Predictions of states for entities may include predicted locations, velocities, trajectories, orientations, and the like, at various time intervals beyond the current time. In some examples, to perform a prediction of an entity state based on an updated GNN, the entity prediction component 234 may select and decode specific portions of the GNN including the entity and selected edges/nodes that are more closely positioned or related to the entity, rather than decoding the entire GNN.

EXAMPLE CLAUSES

A. A system comprising: one or more processors; and one or more non-transitory computer-readable media storing computer-executable instructions that, when executed, cause the system to perform operations comprising: receiving first data associated with a first object in an environment in which an autonomous vehicle is operating, wherein the first data comprises a classification of the first object and a position of the first object at a first time; receiving second data associated with a map element in the environment, wherein the second data comprises a classification of the map element and a position of the map element; associating the first data with a first node of a graph neural network (GNN); associating the second data with a second node of the GNN; associating, with an edge feature of the GNN associated with the first node and the second node, a value indicating a relative position between the first object and second object; performing an inference operation on the GNN; determining, based on an output of the inference operation, predicted data associated with the first object at a second time after the first time; and controlling the autonomous vehicle based at least in part on the predicted data associated with the first object.

B. The system of paragraph A, wherein associating the second data with the second node comprises: determining a polyline based on the second data, the polyline comprising a first line segment and a second line segment; determining, based at least in part on the first line segment, a first encoded line segment; determining, based at least in part on the second line segment, a second encoded line segment; and associating an aggregation including the first encoded line segment and the second encoded line segment with the second node of the GNN.

C. The system of paragraph B, the operations further comprising: determining an orientation of the polyline relative to a map of the environment; and determining a rotational offset for the polyline, based on the orientation, wherein encoding the first line segment and the second line segment is based at least in part on the rotational offset for the polyline.

D. The system of paragraph A, the operations further comprising: receiving third data associated with a third object in the environment; associating the third data with a third node of the GNN; and determining, based on the output of the inference operation, predicted data associated with third object at the second time.

E. The system of paragraph D, the operations further comprising: associating a first weight value with the edge feature of the GNN associated with the first node and the second node; and associating a second weight value with a second edge feature of the GNN associated with the second node and the third node, wherein the second weight value is different from the first weight value, wherein determining the predicted data associated with the first object is based at least in part on the first weight value, and wherein determining the predicted data associated with the third object is based at least in part on the second weight value.

F. A method comprising: receiving first data associated with an object in an environment, wherein the first data comprises a classification of the object and a first position of the object at a first time; receiving second data associated with a map of the environment; associating the first data with a first node of a graph structure; associating the second data with a second node of the graph structure; determining relative data between the first node and the second node; associating an edge of the graph structure with the relative data; and determining, based on the graph structure, predicted data associated with the object at a second time after the first time.

G. The method of claim 6, wherein: the object comprises a dynamic object; and the method further comprises updating the graph structure based at least in part on the predicted data.

H. The method of claim 6, wherein: the object comprises a dynamic object; receiving the second data comprises receiving map data from a map server comprising a map element; and associating the edge comprises determining a distance between the dynamic object and the map element.

I. The method of claim 8, further comprising: determining a yaw associated with the dynamic object; and associating the edge with a relative yaw between the dynamic object and the map element.

J. The method of claim 6, wherein associating the second data with the second node of the graph structure comprises: determining a polyline based on the second data, the polyline comprising a plurality of line segments; encoding the plurality of line segments; aggregating the plurality of line segments; and associating the aggregation of the plurality of line segments with the second node of the graph structure.

K. The method of claim 10, further comprising: determining a rotational offset of the polyline with respect to the map, wherein encoding the plurality of line segments is based at least in part on the rotational offset.

L. The method of claim 6, further comprising: determining a weight value based on at least one of the first data or the second data; and associating the weight value with the edge, wherein determining the predicted data associated with the object is based at least in part on the weight value.

M. The method of claim 6, further comprising: receiving third data associated with an autonomous vehicle operating in the environment; associating the third data with a third node in the graph structure; determining a distance between the autonomous vehicle and the object; and removing the first node from the graph structure, based at least in part on the distance.

N. One or more non-transitory computer-readable media storing processor-executable instructions that, when executed by one or more processors, cause the one or more processors to perform operations comprising: receiving first data associated with an object in an environment, wherein the first data comprises a classification of the object and a first position of the object at a first time; receiving second data associated with a map of the environment; associating the first data with a first node of a graph structure; associating the second data with a second node of the graph structure; determining relative data between the first node and the second node; associating an edge of the graph structure with the relative data; and determining, based on the graph structure, predicted data associated with the object at a second time after the first time.

O. The one or more non-transitory computer-readable media of claim 14, wherein: the object comprises a dynamic object; and the operations further comprise updating the graph structure based at least in part on the predicted data.

P. The one or more non-transitory computer-readable media of claim 14, wherein: the object comprises a dynamic object; receiving the second data comprises receiving map data from a map server comprising a map element; and associating the edge comprises determining a distance between the dynamic object and the map element.

Q. The one or more non-transitory computer-readable media of claim 16, the operations further comprising: determining a yaw associated with the dynamic object; and associating the edge with a relative yaw between the dynamic object and the map element.

R. The one or more non-transitory computer-readable media of claim 14, wherein associating the second data with the second node of the graph structure comprises: determining a polyline based on the second data, the polyline comprising a plurality of line segments; encoding the plurality of line segments; aggregating the plurality of line segments; and associating the aggregation of the plurality of line segments with the second node of the graph structure.

S. The one or more non-transitory computer-readable media of claim 18, the operations further comprising: determining a rotational offset of the polyline with respect to the map, wherein encoding the plurality of line segments is based at least in part on the rotational offset.

T. The one or more non-transitory computer-readable media of claim 14, the operations further comprising: determining a weight value based on at least one of the first data or the second data; and associating the weight value with the edge, wherein determining the predicted data associated with the object is based at least in part on the weight value.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving object data associated with a first object perceived via a sensor system in an environment in which an autonomous vehicle is operating, wherein the object data comprises a classification of the first object and a position of the first object at a first time;
receiving map element data associated with a map element in the environment, wherein the map element data comprises a classification of the map element and a position of the map element;
associating the object data with a first node of a graph associated with a graph neural network (GNN);
associating the map element data with a second node of the graph based at least in part on determining an offset of the map element data relative to a map element template and encoding the map element data with the offset;
associating, as an edge feature of the graph associated with the first node and the second node, a value indicating a relative position between the first object and the map element;
performing a first inference operation on the graph using the GNN;
determining, based at least in part on the first inference operation, a first predicted graph with at least one updated node;
determining, based at least in part on the first predicted graph, predicted data associated with the first object at a second time after the first time; and
controlling the autonomous vehicle based at least in part on the predicted data associated with the first object.

2. The system as recited in claim 1, wherein associating the map element data with the second node comprises:
determining a polyline based on the map element data, the polyline comprising a first line segment vector and a second line segment vector;
determining, based at least in part on the first line segment vector, a first encoded line segment;
determining, based at least in part on the second line segment vector, a second encoded line segment; and
associating an aggregation including the first encoded line segment and the second encoded line segment with the second node of the graph.

3. The system as recited in claim 2, the operations further comprising:
determining an orientation of the polyline relative to a map of the environment; and
determining a rotational offset for the polyline, based on the orientation,
wherein encoding the first line segment and the second line segment is based at least in part on the rotational offset for the polyline.

4. The system as recited in claim 1, the operations further comprising:
receiving third data associated with a third object in the environment;
associating the third data with a third node of the graph; and
determining, based on a second inference operation performed on the graph by the GNN, predicted state data associated with the third object at the second time.

5. The system as recited in claim 4, the operations further comprising:
associating a first weight value with the edge feature of the graph associated with the first node and the second node; and
associating a second weight value with a second edge feature of the graph associated with the second node and the third node, wherein the second weight value is different from the first weight value,
wherein determining the predicted state data associated with the first object is based at least in part on the first weight value, and
wherein determining the predicted state data associated with the third object is based at least in part on the second weight value.

6. A method comprising:
receiving object data associated with an object perceived via a sensor system in an environment, wherein the object data comprises a classification of the object and a first position of the object at a first time;
receiving map element data associated with a map element in the environment;
associating the object data with a first node of a graph structure;
associating the map element data with a second node of the graph structure based at least in part on determining an offset of the map element data relative to a map element template and encoding the map element data with the offset;

determining relative data between the first node and the second node;

associating an edge of the graph structure with the relative data;

determining, based at least in part on performing a first inference operation by a graph neural network on the graph structure, a first updated graph structure with at least one updated node; and determining, based at least in part on the first updated graph structure, predicted state data associated with the object at a second time after the first time.

7. The method of claim 6, wherein:
the object comprises a dynamic object; and
associating the edge comprises determining a distance between the dynamic object and the map element.

8. The method of claim 7, further comprising:
determining a yaw associated with the dynamic object; and
associating the edge with a relative yaw between the dynamic object and the map element.

9. The method of claim 6, wherein associating the map element data with the second node of the graph structure comprises:
determining a polyline based on the map element data, the polyline comprising a plurality of line segments;
encoding the plurality of line segments;
aggregating the plurality of line segments; and
associating the aggregation of the plurality of line segments with the second node of the graph structure.

10. The method of claim 6, further comprising:
determining a weight value based on at least one of the object data or the map element data; and
associating the weight value with the edge, wherein determining the predicted state data associated with the object is based at least in part on the weight value.

11. The method of claim 6, further comprising:
receiving third data associated with an autonomous vehicle operating in the environment;
associating the third data with a third node in the graph structure;
determining a distance between the autonomous vehicle and the object; and
removing the first node from the graph structure, based at least in part on the distance.

12. One or more non-transitory computer-readable media storing processor-executable instructions that, when executed by one or more processors, cause the one or more processors to perform operations comprising:
receiving object data associated with an object perceived via a sensor system in an environment, wherein the object data comprises a classification of the object and a first position of the object at a first time;
receiving map element data associated with a map element in the environment;
associating the object data with a first node of a graph structure;
associating the map element data with a second node of the graph structure based at least in part on determining an offset of the map element data relative to a map element template and encoding the map element data with the offset;

determining relative data between the first node and the second node;

associating an edge of the graph structure with the relative data;

determining, based at least in part on performing a first inference operation by a graph neural network on the graph structure, a first updated graph structure with at least one updated node; and determining, based at least in part on the first updated graph structure, predicted state data associated with the object at a second time after the first time.

13. The one or more non-transitory computer-readable media of claim 12, wherein:
the object comprises a dynamic object; and
associating the edge comprises determining a distance between the dynamic object and the map element.

14. The one or more non-transitory computer-readable media of claim 12, wherein associating the map element data with the second node of the graph structure comprises:
determining a polyline based on the map element data, the polyline comprising a plurality of line segments;
encoding the plurality of line segments;
aggregating the plurality of line segments; and
associating the aggregation of the plurality of line segments with the second node of the graph structure.

15. The one or more non-transitory computer-readable media of claim 12, the operations further comprising:
determining a weight value based on at least one of the object data or the map element data; and
associating the weight value with the edge, wherein determining the predicted state data associated with the object is based at least in part on the weight value.

16. The method of claim 6, wherein the relative data comprises at least one of a relative distance, a relative yaw, a relative velocity, a relative pose, a relative size, a relative acceleration, a relative permissibility, or an attribute offset.

17. The method of claim 6, wherein determining the predicted state data associated with the object comprises decoding a first subset of the first updated graph structure associated with the first node.

18. The method of claim 6, wherein associating the map element data with the second node of the graph structure comprises:
determining a map element template associated with the map element; and
determining an offset associated with the map element, relative to the map element template, wherein the offset comprises at least one of:
a rotational offset;
a size offset; or
a shape offset.

19. The method of claim 18, further comprising:
encoding the map element, wherein the offset is applied to the map element before the encoding; and
storing the offset within the edge of the graph structure.

20. The one or more non-transitory computer-readable media of claim 12, the operations further comprising storing the offset within the edge of the graph structure.

* * * * *